US 9,626,693 B2

(12) United States Patent
Smith et al.

(10) Patent No.: US 9,626,693 B2
(45) Date of Patent: Apr. 18, 2017

(54) PROVISION OF ANONYMOUS CONTEXT INFORMATION AND GENERATION OF TARGETED CONTENT

(71) Applicant: Intel Corporation, Santa Clara, CA (US)

(72) Inventors: Ned M. Smith, Beaverton, OR (US); Thomas Gerard Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,918

(22) PCT Filed: Dec. 20, 2012

(86) PCT No.: PCT/US2012/071029
§ 371 (c)(1),
(2) Date: Jun. 25, 2013

(65) Prior Publication Data
US 2014/0180816 A1    Jun. 26, 2014

(51) Int. Cl.
*G06Q 30/00*    (2012.01)
*G06Q 30/02*    (2012.01)

(52) U.S. Cl.
CPC ..... *G06Q 30/0251* (2013.01); *G06Q 30/0257* (2013.01)

(58) Field of Classification Search
CPC ....................................................... G06Q 30/02
USPC ........................................................ 705/14.71
See application file for complete search history.

(56) References Cited

U.S. PATENT DOCUMENTS 7,194,424 B2    3/2007    Greer et al.
7,689,672 B2    3/2010    Kanojia et al.
(Continued)

FOREIGN PATENT DOCUMENTS

CN    1848742 A    10/2006
CN    102193794 A    9/2011
(Continued)

OTHER PUBLICATIONS

International Search Report and Written Opinion mailed Sep. 27, 2013 for International Application No. PCT/US2012/071029, 11 pages.
(Continued)

*Primary Examiner* — Sun Li
(74) *Attorney, Agent, or Firm* — Schwabe, Williamson & Wyatt, P.C.

(57) ABSTRACT

Embodiments of the present disclosure are directed towards selective disclosure of user or computing environment attributes to facilitate generation and/or provision of targeted content. In various embodiments, a likelihood that disclosure of an attribute of a user or of a computing environment associated with the user will enable identification of the user may be determined based on an associated population count of users or computing environments sharing the same attribute. In various embodiments, the attribute may be selectively disclosed to a content provider configured to provide targeted content, or a recommendation may be selectively provided to the user as to whether the user should disclose the attribute to the content provider, based on the determination and a risk tolerance associated with the user. In various embodiments, a dimension authority may track and make available population counts of users or computing environments having various attributes.

20 Claims, 9 Drawing Sheets

(56) References Cited

U.S. PATENT DOCUMENTS

| | | | |
|---|---|---|---|
| 8,396,746 B1* | 3/2013 | Wang | 705/14.69 |
| 2006/0085263 A1 | 4/2006 | Greer et al. | |
| 2008/0028066 A1* | 1/2008 | Berkhin et al. | 709/224 |
| 2008/0162693 A1* | 7/2008 | Kanojia et al. | 709/224 |
| 2008/0222283 A1* | 9/2008 | Ertugrul et al. | 709/224 |
| 2008/0228767 A1 | 9/2008 | Kenedy et al. | |
| 2009/0248496 A1 | 10/2009 | Hueter et al. | |
| 2010/0024042 A1 | 1/2010 | Motahari et al. | |
| 2011/0282964 A1 | 11/2011 | Krishnaswamy et al. | |
| 2011/0289590 A1 | 11/2011 | Miettinen | |
| 2012/0023334 A1 | 1/2012 | Brickell et al. | |
| 2012/0042253 A1 | 2/2012 | Priyadarshan et al. | |
| 2012/0158516 A1* | 6/2012 | Wooten et al. | 705/14.66 |
| 2012/0221701 A1 | 8/2012 | Mair et al. | |
| 2012/0239504 A1* | 9/2012 | Curlander et al. | 705/14.66 |

FOREIGN PATENT DOCUMENTS

| | | |
|---|---|---|
| KR | 20050014940 A | 2/2005 |
| WO | WO2009/127771 A1 | 10/2009 |
| WO | WO2011/143625 A2 | 11/2011 |

OTHER PUBLICATIONS

Toubiana, Vincent et al., "Adnostic: Privacy Preserving Targeted Advertising", accessed from http://crypto.stanford.edu/adnostic/ on Sep. 4, 2013, 16 pages.

"Mash Maker—A Paradigm Shift in Web Browsing", 23 pages.

Smith, Ned M. "Priorityizing Facts for On-line Trust Negotiation", Intel Corporation, Hillsboro, Oregon, 7 pages.

Krawczyk, Hugo, "SIGMA: the 'SIGn-and-MAc' Approach to Authenticated Diffe-Hellman and its Use in the IKE Protocols*", Jun. 12, 2003, 32 pages.

International Search Report an Written Opinion mailed Dec. 11, 2014 for International Application No. PCT/US2014/053589, 13 pages.

Office Action mailed Oct. 30, 2014 for U.S. Appl. No. 14/035,559, 27 pages.

Final Office Action mailed Apr. 21, 2015 for U.S. Appl. No. 14/035,559, 31 pages.

Extended European Search Report mailed Jul. 22, 2015 for European Application No. 12890250.9, 7 pages.

International Preliminary Report on Patentability mailed Apr. 7, 2016 for International Application No. PCT/US2014/053589, 10 pages.

Notice of Preliminary Rejection mailed Jul. 1, 2016 for Korean Application No. 2015-7013352, 13 pages.

Non-Final Office Action mailed Sep. 29, 2016 for U.S. Appl. No. 14/035,559, 75 pages.

International Preliminary Report on Patentability mailed Jul. 2, 2015 for International Application No. PCT/US2012/071029, 8 pages.

Extended European Search Report mailed Feb. 2, 2017 for European Application No. 14847278.0, 10 pages.

* cited by examiner

PROVISION OF ANONYMOUS CONTEXT INFORMATION AND GENERATION OF TARGETED CONTENT

CROSS REFERENCE TO RELATED APPLICATIONS

The present application is a national phase entry under 35 U.S.C. §371 of International Application No. PCT/US2012/071029, filed Dec. 20, 2012, entitled "PROVISION OF ANONYMOUS CONTEXT INFORMATION AND GENERATION OF TARGETED CONTENT", which designated, among the various States, the United States of America. The Specification of the PCT/US2012/071029 Application is hereby incorporated by reference.

FIELD

Embodiments of the present disclosure generally relate to the field of data processing, and more particularly, to techniques and configurations for provision of anonymous contextual information and generation of targeted content.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Computing device users may knowingly or unknowingly disclose, to various entities over a computer network, information associated with a user or the computing device that may be usable to identify or locate the user, including but not limited to personal information, activities, proclivities, computing environments, relationships (e.g., with people, places or things), computing devices, physical environment, information captured from computing device sensors (or inferences drawn from that information), preferences, patterns of behavior, and/or any other information useful in identifying or understanding a user and his or her interests (collectively "context information").

In return, entities such as advertisers or vendors of goods/services may provide content targeted to the user. The user may benefit from this personalized content by having a better experience with content that is more likely to be relevant or desirable. Entities such as advertisers and vendors may benefit because users are more likely to engage targeted content than untargeted content. However, users may wish to protect their privacy. Disclosure of personal or contextual information to one or more entities over a computer network may enable personal identification of the user and/or other undesirable side effects, such as a precise location of the user. This loss of privacy may lead to damage of the user's reputation, financial well being, and/or safety.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "block," "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. An "entity" may refer to any combination of hardware or software that is configured to interact with other entities, such as a server portion of a client-server application (e.g., a hypertext transport protocol, or "HTTP," server), an application function, a web service, and so forth.

Figure 1:
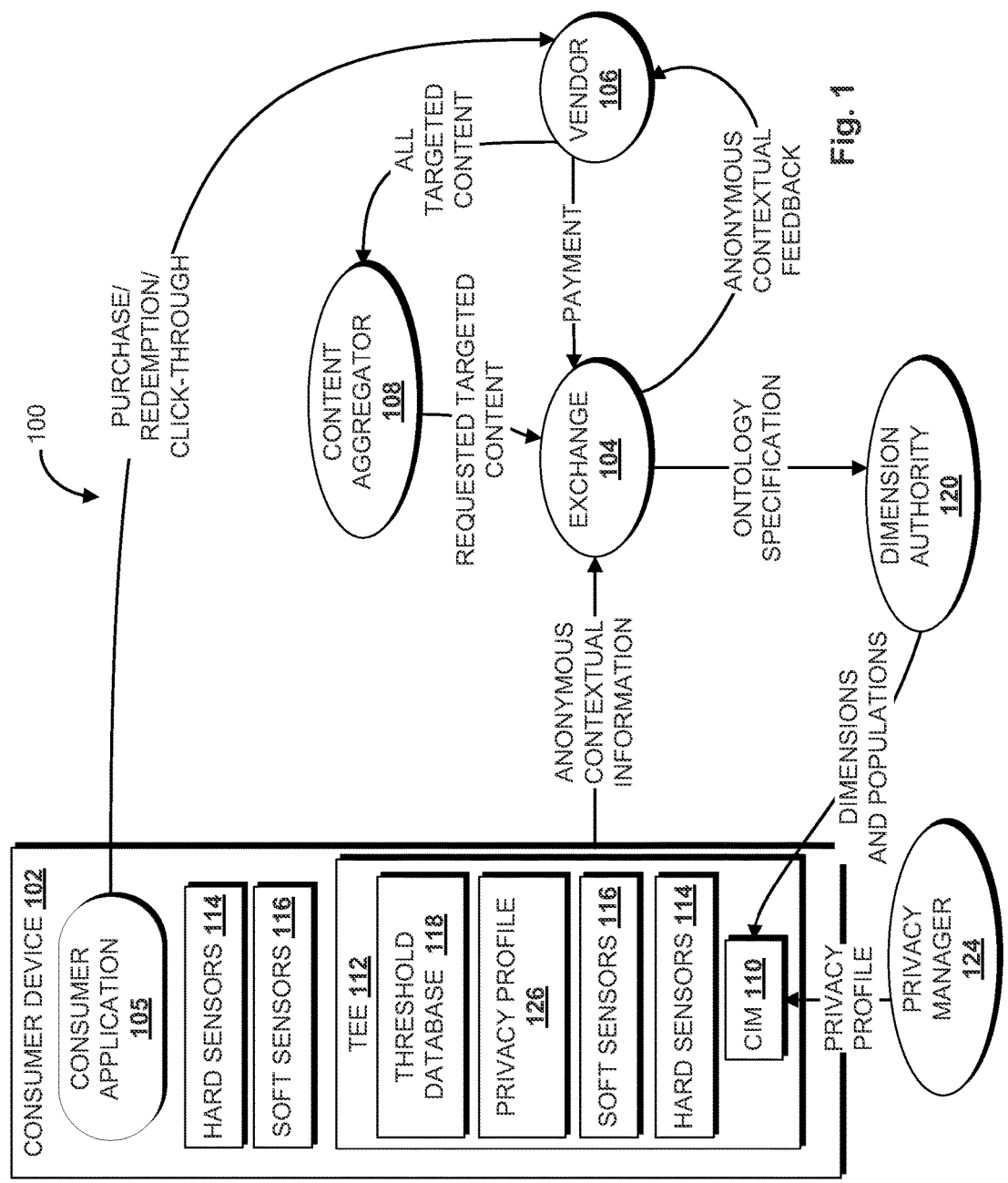
FIG. 1 schematically illustrates an example E-commerce system, in accordance with various embodiments.

With reference to FIG. 1, an example E-commerce system 100 may include one or more entities operating on one or more computing devices in communication with each other via one or more computer networks (not specifically identified in FIG. 1). The various entities and computing devices may include a user (not shown, also referred to as a "consumer," particularly in the context of E-commerce) operating a computing environment provided in whole or in part by a consumer device 102 to interact with the various other computing devices of E-commerce system 100.

In various embodiments, a "computing environment associated with a user" may refer to one or more physical computing devices associated with a user (e.g., operated by and/or owned the user or someone with which the user has a relationship) and/or functionality provided to a user or users by one or more computing devices. For example, a user may be provided, e.g., by one or more servers of a server farm, with control of a virtual machine that itself provides the user with a software operating environment (e.g., an operating system and one or more applications). In such a scenario, the one or more servers executing the virtual machine, the virtual machine itself, and/or any applications available on the virtual machine may together be considered a computing environment associated with the user.

Consumer device 102 may be any device that processes data, including but not limited to a laptop, a netbook, a notebook, an Ultrabook™, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, a digital video recorder, a portion of a server, a cloud service, and so forth, or a distributed collection of such resources. Although repeatedly referred to herein as a "consumer" device, this is not meant to limit embodiments only to devices used by consumers for purchasing goods or services. Targeted content may be generated for computing devices and/or computing environments used for other purposes as well.

Consumer device 102 may access E-commerce system 100 through various computing devices, which by virtue of the networked communication, may also be referred as "nodes." In FIG. 1, for instance, consumer device 102 may access E-commerce system 100 by way of an exchange node (also referred to as an "E-commerce exchange") 104. Exchange node 104 may be an entity configured to provide a portal to a user of consumer device 102. In some embodiments, the portal may provide one or more web pages that provide one or more links to content provided by exchange node 104 or content provided by other entities. The user may navigate these web pages and links using a consumer application 105 executing on consumer device 102, such as a web browser. In other embodiments, the portal may provide an interface that enables the users to consume various content, such as videos.

Portals may be of various types. In some embodiments, exchange node 104 may provide an E-commerce portal that enables a user to shop for products and/or services from a plurality of vendors. In some embodiments, exchange node 104 may provide a more general purpose portal that provides access to content from vendors, news organizations, financial services, various interest groups (e.g., technical or cultural organizations) and so forth. In various embodiments, exchange node 104 may provide a portal that includes a search engine interface. In various embodiments, exchange node 104 may include content targeted to a particular user, e.g., as an advertisement on a portion of a graphical user interface.

A vendor 106 may be any entity that buys, offers to buy, sells, offers to sell and/or exchanges goods or services with other entities of the system. Vendor 106 may also generate and/or provide content targeted to users, directly to consumer devices 102 or by way of one or more other entities, as will be described below. In various embodiments, a content aggregator 108 may act as a "middleman" between vendors 106 and the other entities with whom vendors buy/sell products/services. For example, content aggregator 108 may store and make available, e.g., upon request by exchange node 104, targeted content generated by vendors 106.

In traditional E-commerce and other systems, entities such as vendors 106, advertisers (not shown), and so forth may generate targeted content based on contextual information received from consumer device 102. For instance, vendor 106 may track a user's browsing history, purchase history, history of offers redeemed, etc., using various pieces of the user's personal information (e.g., name, address, social security number, financial information, demographic information, location, etc.). Based on this tracked information, vendors 106 may generate content such as advertisements, offers, and coupons that are targeted to the user.

Targeted content may come in various forms, and may be presented to the user for consumption in various ways. In various embodiments, targeted content may include content exchanged via email, simple messaging service ("SMS"), multimedia messaging service ("MMS"), advertisements incorporated onto web pages (e.g., banner ads), and so forth. In various embodiments, content may come in various formats, including but not limited to audio, video, a combination of audio and video, visual, verbal, pictorial, and so forth. In some embodiments where exchange node 104 operates a webpage portal, targeted content may come in the form of banner advertisements, pop up windows, and so forth. In some embodiments where exchange node 104 operates a video portal, targeted content may be in the form of video advertisements interspersed within other video.

Generation and provision of targeted content may benefit vendor 106 and other entities because a user may be more likely to engage targeted content than non-targeted content. Receipt of targeted content may benefit users because by increasing a likelihood that content consumed by the user will be relevant/interesting to the user, and/or by decreasing a likelihood that content consumed by the user will not be relevant (e.g., spam).

A user's personal information that is used to generate/provide targeted content may be stored in multiple locations on a network. For example, multiple vendors from which the user has purchased goods or services may have copies of the user's personal data. The user may be forced to rely on security and other safeguards employed by these multiple vendors in order to prevent unauthorized disclosure of the user's personal information to third parties. The more locations with a user's personal information, the more risk that at least one of those locations will fail to adequately protect that information. Moreover, once a user's personal information is stored on one or more locations on a network, it may be difficult to remove the user's personal information from the network.

Accordingly, in various embodiments, consumer device 102 may not disclose a user's personal information in order to facilitate generation of targeted content, e.g., by vendors 106. Instead, consumer device 102 may be configured to provide or otherwise disclose, to one or more remote computing devices configured to provide targeted content, "anonymous context information" associated with consumer device 102 or a user of consumer device 102.

In various embodiments, anonymous context information may include one or more "dimensions." In various embodiments, a dimension may include an attribute of the user or a computing environment associated with the user, and a population count of users or computing environments sharing the attribute. An attribute of a computing environment associated with a user may include an attribute of one or more physical computing devices associated with the user (e.g., operated by and/or owned the user or someone with which the user has a relationship), an attribute of a virtual machine provided for use by the user or someone with which the user has a relationship, an attribute of software associated with the user (e.g., operated by and/or owned the user or someone with which the user has a relationship), context data (e.g., temperature, velocity, location, etc.) sensed by a computing device associated with the user or someone with which the user has a relationship, and so forth.

Dimensions, and more particularly, dimension attributes, may be selectively disclosed to facilitate generation and/or provision of content targeted towards consumer device 102 or its user, without enabling user identification. In various embodiments, a dimension attribute, alone or in combination with other dimension attributes, may serve as indicators of a user's willingness to engage certain content.

In various embodiments, a dimension may be expressed as a tuple, <attribute, population count>. For example, a computing environment may have the dimension <"iPhone", 37M>, which means a user is operating an iPhone, and that there are currently 37 million iPhone users. In various embodiments, attribute itself may be a measure (e.g., "iPhone") or a tuple, <attribute, measure> (alternatively expressed as attribute.measure). For example, a computing device may have the dimension <location.Portland, 1.3M>. As used herein, the terms "dimension attribute" and "attribute" may refer to either a standalone attribute (e.g., "iPhone") or an attribute.measure tuple (e.g., phoneType.iPhone).

In some embodiments, dimensions may be expressed as an ontology or taxonomy, e.g., of dependent dimension attributes. For example, a dimension taxonomy may be expressed as "car→ford→pickup→red". Each attribute measure (except car) may be a specialization of the value to its left, and may have an associated population count (e.g., of users owning vehicles sharing that dimension attribute).

In various embodiments, consumer device 102 may include a consumer information manager ("CIM") 110. CIM 110 may be logic implemented with any combination of hardware and software. In various embodiments, CIM 110 may be configured to, among other things, control provision and/or disclosure of anonymous contextual information, to protect the user's privacy while enabling generation and/or provision of targeted content for the user. In various embodiments, CIM 110 may be implemented in a trusted execution environment ("TEE") 112 of consumer device 102. TEE 112 may come in various forms or be provided by various technologies, such as Trusted Execution Technology ("TXT") and the Trusted Platform Module ("TPM") by the Intel Corporation of Santa Clara, Calif., Manageability Engine ("ME"), the TrustZone Security System by ARM Holdings in Cambridge, United Kingdom, Virtualization Technology ("VT-x"), or ucode enforced thread and memory access isolation.

Dimension attributes of consumer device 102 may have various measures, including but are not limited to data sensed by one or more "hard" sensors 114 of consumer device 102, a computer-readable address of consumer device 102 (e.g., IP address, MAC address), hardware or software configuration/capabilities of consumer device 102, and so forth. Hard sensors 114 may include a variety of sensors, such as a global positioning system ("GPS"), barometer, thermometer, accelerometer, and so forth, that may provide contextual data about consumer device 102. Hard sensors 114 may be employed in various portions of consumer device 102. For example, in FIG. 1, hard sensors 114 may be employed on consumer device 102 both within and outside of TEE 112.

Dimension attributes of a user of consumer device 102 may have various measures, including but not limited to demographic information about the user, such as age, socio-economic status, gender, group affiliations (e.g., political party, group membership), physical attributes (e.g., hair color, eye color, body type, fitness level), occupation, family status (e.g., married, number of children), and so forth. Dimension user attributes may also include information about and/or probative of proclivities/affinities of the user, such as past purchase history, preferences for various products, past coupon or offer redemption history, hobbies, relationships, affiliations, and so forth.

In various embodiments, dimension attributes of the user may be obtained from one or more "soft" sensors 116. Soft sensors 116 may include any combination of hardware and/or software, on consumer device 102 or elsewhere. Soft sensors 116 may be configured to obtain various user dimension attributes from within consumer device 102 or elsewhere, such as a user's schedule (e.g., from an online calendar), demographic data (e.g., from various online accounts such as a social network), relationships (e.g., from a social network), history (e.g., past purchases, past redemptions, records of past engagements, browsing history, etc.) or proclivities (e.g., from a social network and/or an interest graph).

In various embodiments, dimension attributes may be selectively disclosed by CIM 110, or a recommendation may be selectively provided to the user as to the advisability of disclosure, based on a likelihood that disclosure of the dimension attribute will enable identification of the user, to comply with a risk tolerance associated with the user.

Disclosure of one or more dimension attributes of consumer device 102 or a user thereof may enable, e.g., exchange node 104, to request content (e.g., advertisements, coupons, offers, etc.) that is targeted towards the one or more dimension attributes. For instance, assume consumer device 102 selectively broadcasts two dimension attributes of a user—"diet.vegan" and "location. Portland, Oreg."—to exchange node 104. Exchange node 104 may request, e.g., from content aggregator 108, content targeted towards these dimension attributes. Content aggregator 108 may search targeted content it obtained from vendor 106 to find targeted content such as advertisements, offers or coupons for vegan-style restaurants in Portland, Oreg., and provide them to exchange node 104. In some embodiments, targeted content may be injected (e.g., by content aggregator 108 or vendor 106) with metadata describing one or more attributes to which the content is targeted. Exchange node 104 may in turn provide the targeted content to consumer device 102, e.g., as search results or banner advertisements on a webpage.

The user of consumer device 102 may then have the ability to engage the targeted content, e.g., by redeeming a coupon to a particular restaurant, ordering food from a particular vegan restaurant, or by clicking through one or more links in the targeted content. Vendor 106 or content aggregator 108 may "learn" from engagement of a particular targeted content that the content was appropriately targeted towards the two dimension attributes. Over time, these entities may continue to "learn" from subsequent user engagements of targeted content, and may tailor future targeted content accordingly.

The likelihood that disclosure of one or more dimension attributes will enable identification of the user may be based at least in part on an associated population count of the dimension (e.g., computing environments or users sharing the dimension attribute). For example, the dimension attribute "location.Portland" may have a large population count at any given moment. However, relatively few people will have a dimension attribute "location.Fifth and Broadway" at any given moment. CIM 110 may use a dimension population count to determine whether the corresponding dimension attribute is "safe" to disclose. If the user's dimension attribute is currently "location.Fifth and Broadway," then disclosure of this dimension attribute may be more likely enable identification (or pinpoint location) of the user than if it were "location.Portland." In such case, CIM 110 may disable or otherwise prevent consumer device 102 from providing this dimension attribute, or may "anonymize" this dimension attribute, e.g., by providing a less granular location characteristic (e.g., "Oregon") or by injecting entropy into the location.

A risk tolerance of a user may be defined in various ways. In some embodiments, a risk tolerance of a user may be represented by one or more so-called "anonymity thresholds." Prior to disclosing anonymous context information, CIM 110 may calculate a so-called "anonymity index" based on the dimensions of the anonymous context information to be disclosed and population counts of each dimension. CIM 110 may then compare the anonymity index to one or more appropriate anonymity thresholds, e.g., associated with an entity to which consumer device 102 would be disclosing or with a dimension having an attribute to be disclosed. In various embodiments, anonymity thresholds for entities and dimensions may be maintained in a threshold database 118.

A user may have various levels of trust in entities to which the user discloses anonymous context information. Accordingly, in various embodiments, a different anonymity threshold may be maintained, e.g., by CIM 110 in threshold database 118, for each entity to which a user discloses data. For example, an anonymity threshold associated with a particular vendor 106 may reflect a relatively high level of user trust, e.g., based on a history of interaction with that vendor 106. An anonymity threshold associated with an untrusted entity, such as exchange node 104 or a "publish-and-subscribe" ("P&S") server (not shown in FIG. 1 but described below), may be considerably lower.

Users may be provided with the ability to manually configure their risk tolerances, e.g., by raising or lowering anonymity thresholds associated with various entities or dimensions. However, this task may prove too complicated for some users, and too onerous for most. Accordingly, in various embodiments, a privacy manager 124 may ensure that a user's privacy interests Privacy manager 124 may provide advice to the user and/or configure CIM 110 on the user's behalf to appropriately protect the user's privacy interests, while still enabling the user to disclose or otherwise provide sufficient dimension attributes to facilitate provision of targeted content. In some embodiments, privacy manager 124 may be a service provider, such as a lawyer, an accountant, or a financial planner, or an entity such as a corporation. In other embodiments, privacy manager 124 may be any combination of hardware and software operating on consumer device 102 and/or elsewhere (e.g., a web service).

In various embodiments, a dimension authority 120 may be configured to track a count of computing environments or users that share a dimension attribute. In various embodiments, dimension authority 120 may provide, or otherwise make available, dimensions, including their attributes and population counts, to other network entities. For example, dimension authority 120 may provide dimensions to CIM 110, e.g., to enable CIM 110 to selectively disclose dimension attributes in exchange for content targeted towards consumer device 102 or its user. Dimension authority 120 may also provide dimensions to content providers or generators such as vendor 106, e.g., to enable content providers to selectively generate content targeted towards attributes of those dimension. Dimension authority 120 may be implemented with any combination of hardware and software, on a single computing device or across multiple computing devices.

Dimensions may be created in various ways for various reasons. In various embodiments, dimension authority 120 may receive, e.g., from exchange node 104 or vendor 106, an ontology specification including one or more potential dimension attributes of computing environments or users to be tracked. For instance, exchange node 104 may select computing environment or user attributes for tracking based on user behavior (e.g., keyword searches by users, etc.), and provide a resultant ontology specification to dimension authority 120. Dimension authority 120 may be configured to create a dimension and track a population of computing devices or users having the dimension attribute.

Figure 2:
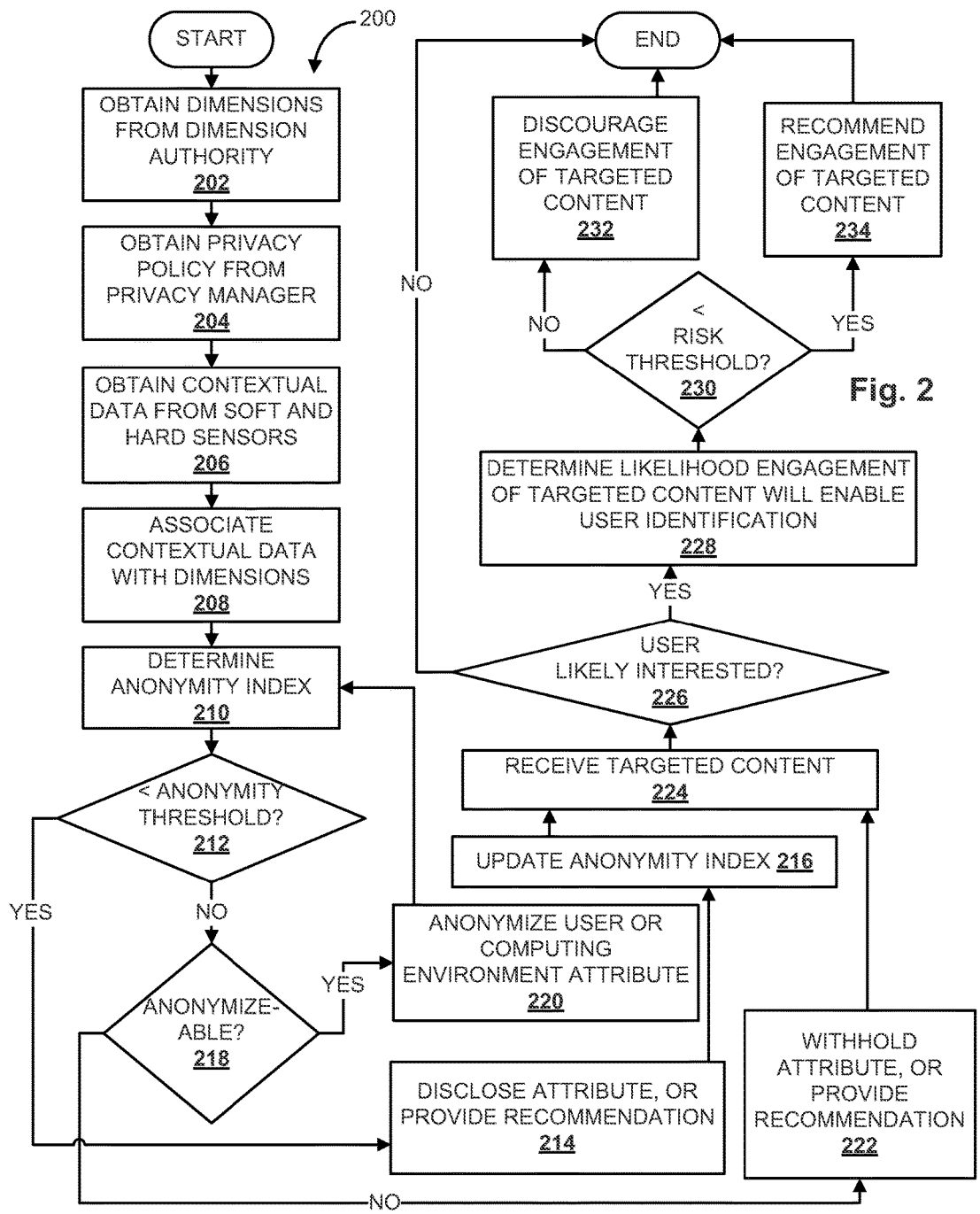
FIG. 2 schematically illustrates an example method that may be implemented on a consumer device, in accordance with various embodiments.

FIG. 2 depicts an example method 200 that may be implemented on consumer device 102, e.g., by CIM 110. At block 202, CIM 110 may obtain, from dimension authority 120, dimensions, including dimension attributes and corresponding counts of users or consumer devices sharing those dimension attributes. In various embodiments, dimension authority 120 may only provide dimensions to computing devices (e.g., consumer device 102) that are able to authenticate themselves to dimension authority 120. In some embodiments, computing devices may be preconfigured (e.g., during manufacturing) with data, such as an "enhanced privacy identifier," or "EPID," necessary to authenticate themselves to dimension authority 120. In some cases, this preconfigured data may be unavailable for use in any other way. Additionally, dimensions provided by dimension authority 120 (e.g., upon authentication of consumer device 102) may be signed by a symmetric or asymmetric key, which may be referred to herein as a "dimension key."

A dimension key may be any data configured to enable authentication of the source of the data and/or that the data itself is authentic. Consumer device 102 may sign dimension attributes it discloses later with the dimension key. In this manner, the receiving entities (e.g., exchange node 104, vendor 106) may also be able to confirm the authenticity of the dimension attributes. Use of dimension keys in this manner may prevent unauthorized parties from propagating false dimension attributes. For example, a first competitor may be prevented from providing false dimension attributes to a second competitor, in an effort to make the second competitor falsely believe that particular dimension attributes exist and/or are compelling to consumers.

At block 204. CIM 110 may obtain a privacy profile 126 from privacy manager 124. For example, if privacy manager 124 is a hired service provider, he or she may locally or remotely operate an interface provided by CIM 110 to configure one or more anonymity thresholds associated with the user. If privacy manager 124 is logic (hardware and/or software on consumer device 102 and/or elsewhere), it may provide configuration data to CIM 110 that enables CIM 110 to make decisions with regard to disclosure of dimension attributes of the user or consumer device 102.

At block 206, CIM 110 may obtain contextual data from one or more sources, e.g., on consumer device 102 or elsewhere, e.g., hard sensors 114 and/or soft sensors 116.

At block 208, CIM 110 may associate the contextual data with dimensions it obtained at block 202. For example, assume "location" is a dimension obtained from dimension authority 120, and that CIM 110 receives GPS coordinates from a GPS sensor of consumer device 102 that indicates consumer device is located in Portland, Oreg. CIM 110 may assign the location dimension's attribute the value of the sensed GPS coordinates, e.g., to yield a dimension attribute measure of "Portland." As noted above, each dimension may have an associated count of users or devices sharing the dimension attribute. In this example, a count for the "location" dimension attribute measure "Portland" may include all users or devices that are located, or were last known to be located, in Portland.

Before disclosing any contextual information, CIM 110 may determine a likelihood that disclosure will enable identification of the user in a variety of ways. For example, at block 210, CIM 110 may calculate an anonymity index based on one or more population counts of one or more dimensions to be disclosed. In various embodiments, an anonymity index may be calculated using a formula such as equation (1):

$$\text{anonymity\_index} = 1 - \sum_{i=0}^{n} \frac{1}{\log_2 d_i} \quad (1)$$

where $d_i$=population count of dimension i; n=the number of dimensions; and i, n and d are all positive integers. In various embodiments, an anonymity index value of one means the user is absolutely anonymous, and an anonymity index value of zero means the user would be uniquely identifiable based on the disclosure. In various embodiments anonymity index values<0.8 may represent high risk that disclosure of the dimension attributes will enable identification of the user, whereas anonymity index values>0.9 may be considered safe.

It may be assumed, from a privacy perspective, that an entity to which one or more dimension attributes are disclosed is likely to retain those dimension attributes in an attempt to use with later-disclosed dimension attributes to identify or locate a user. Accordingly, in various embodiments, an anonymity index may be calculated based on both currently-pending dimension attribute disclosures and past disclosures of dimension attributes.

For instance, in various embodiments, prior to disclosure of one or more dimension attributes to a particular entity, when the anonymity index is calculated, one or more anonymity indices calculated prior to disclosure to the same entity may be taken into account, e.g., to yield a cumulative anonymity index. For example, in various embodiments, an average of anonymity indices calculated for past disclosures to the particular entity may be averaged with the most recently calculated anonymity index for the entity. In various embodiments, this cumulative anonymity index, rather than the most recently calculated anonymity index, may be used to determine a likelihood that disclosure will enable user identification.

As another example, dimension attributes disclosed to an entity may be tracked over time, e.g., by CIM 110. Whenever a user wishes to disclose additional dimension attributes to the entity, all disclosures to that entity, past and present, may be used as input to equation (1), above. For example, a user may disclose three dimension attributes to a particular vendor 106. Assuming the user had never before disclosed any dimension attributes to that vendor 106, equation (1) may be used to calculate the cumulative anonymity index with n=3. Later, the user may disclose two additional dimension attributes (e.g., different that the three disclosed previously) to the same vendor 106. At that time, the cumulative anonymity index may be calculated using equation (1) with the three previously disclosed dimension attributes (including their associated population counts at the time of disclosure) and the two new dimensions, and with n=5. In this way, the more dimension attributes a user discloses to a particular entity over time, the closer the anonymity index may get to an anonymity threshold.

Referring back to FIG. 2, CIM 110 may then determine whether a likelihood that disclosure of the dimension attributes will enable user identification comports with a risk tolerance of the user. For example, at block 212, CIM 110 may determine whether the anonymity index calculated at 210 is less than with an anonymity threshold associated with a particular recipient entity or dimension with an attribute to be disclosed. Although not shown in FIG. 2, in some embodiments, CIM 110 may also take into consideration a security level of a computer system (e.g., a router, firewall and/or gateway) and/or a network through which a disclosed attribute would pass.

If the answer at block 212 is yes, then at block 214, CIM 110 may either enable consumer device 102 to disclose the one or more dimension attributes to one or more remote computing devices, or provide a recommendation to the user that disclosure will comply with the user's risk tolerance. For example, if the user is visiting exchange node 104 (e.g., using a web browser), CIM 110 may provide one or more non-user-identifying dimension attributes to exchange node 104, or inform the user that it would be "safe" to do so.

In various embodiments, assuming the dimensions attributes are disclosed at block 214, CIM 110 may first alter or otherwise obfuscate a network address (e.g., IP address) of consumer device 102, e.g., using randomization or network address translation. This may prevent exchange node 104 from being able to identify consumer device 102 based on a communication from consumer device 102 providing anonymous context information. Additionally or alternatively, CIM 110 may enable consumer device 102 to broadcast (or multicast) anonymous context information, e.g., via a P&S server. At block 216, CIM 110 may update the anonymity index to reflect the disclosure.

However, at block 212, if the answer is no, then at block 218, the CIM 110 may determine whether it is possible to "anonymize" the attributes-to-be-disclosed to decrease the likelihood that disclosure will enable user identification. Anonymous context information may be anonymized in various ways. For example, entropy injection may be employed (e.g., randomizing GPS coordinates, network address, other identifier), or dimension attributes of the anonymous context information may be altered (e.g., added, excluded, modified, obfuscated, substituted). For instance, an attribute of a dimension having a large population count may be added to the data that is disclosed. As another example, a dimension attribute with a small population (e.g., proclivity for Irish folk music) may be abstracted to an attribute with a larger population (e.g., proclivity for music).

After anonymization, method 200 may proceed back to blocks 210-212, where CIM 110 again may calculate the anonymity index and determine whether it is less than with an anonymity threshold associated with a particular recipient entity or dimension attribute to be disclosed. If the answer is yes, then method may proceed to block 214 as described above.

However, if the answer is still no, then at block 218, CIM 110 may determine whether the data can be anonymized further. If the answer is yes, the anonymous context information may be anonymized again at block 220 and retested at blocks 210-212. But if the answer at block 218 is no, then at block 222, CIM 110 may either make a decision on behalf of the user and withhold the anonymous context information, or CIM 110 make provide a recommendation to the user indicating that disclosure of the anonymous context information poses a risk of user identification that does not comply with the user's risk tolerance.

Regardless of whether CIM 110 provides the anonymous context information in its original or anonymized form, or withholds provision of the anonymous context information, consumer device 102 may then await receipt of targeted content. If consumer device 102 provided the anonymous context information at block 214, then received targeted content may be based on that anonymous context information. If consumer device 102 withheld anonymous context information at block 222, then received targeted content may be based on other anonymous context information provided by consumer device 102 at another time.

At block 224, consumer device 102 may receive targeted content, e.g., from exchange node 104 on behalf of content aggregator 108 and/or vendor 106, or from a P&S server (described below). For example, consumer device 102 may receive a communication such as an email or text, or if visiting a portal may be presented with a targeted advertisement intended to be displayed in the margin of the portal's webpage.

At block 226, CIM 110 may determine whether the user is likely going to be interested in the received targeted content. This determination may be made based on various information, such as one or more dimensions of the user or consumer device 102, context data obtained from hard sensors 114 and/or soft sensors 116, metadata injected into the targeted content (e.g., by vendor 106), and so forth. If the answer is no, then CIM 110 may not make the targeted content available to the user for consumption (e.g., filtering out SPAM, refrain from displaying ad unit in margin), and method 200 may end.

If, however, the answer at block 226 is yes, then at block 228, CIM 110 may determine a likelihood that engagement of the targeted content (e.g., purchasing a good or service, clicking through a link, redeeming a coupon, etc.) will enable identification of the user. This determination may be made based on various empirical data. For instance, CIM 110 may determine a likelihood that use of a particular payment technology (e.g., digital cash, credit card, PayPal®) to purchase a good or service will enable identification of the user.

At block 230, CIM 110 may determine whether the likelihood that engagement of the targeted content will enable identification of the user exceeds the user's risk tolerance. If the answer at block 230 is yes, then at block 232, CIM 110 may discourage engagement of the targeted content. For instance, CIM 110 may cause a notification to be provided to the user (e.g., via a pop-up window) recommending that the user not redeem the coupon or click through the link. If the answer at block 230 is no, however, then at block 234, CIM 110 may recommend or otherwise approve engagement by the user of the targeted content. In some embodiments, prior to engagement, CIM 110 may alter or otherwise obfuscate a network address (e.g., IP address) of consumer device 102, e.g., using randomization or network address translation. This may prevent vendor 106 from being able to identify consumer device 102 based on a communication from consumer device 102 engaging the targeted content.

Figure 3:
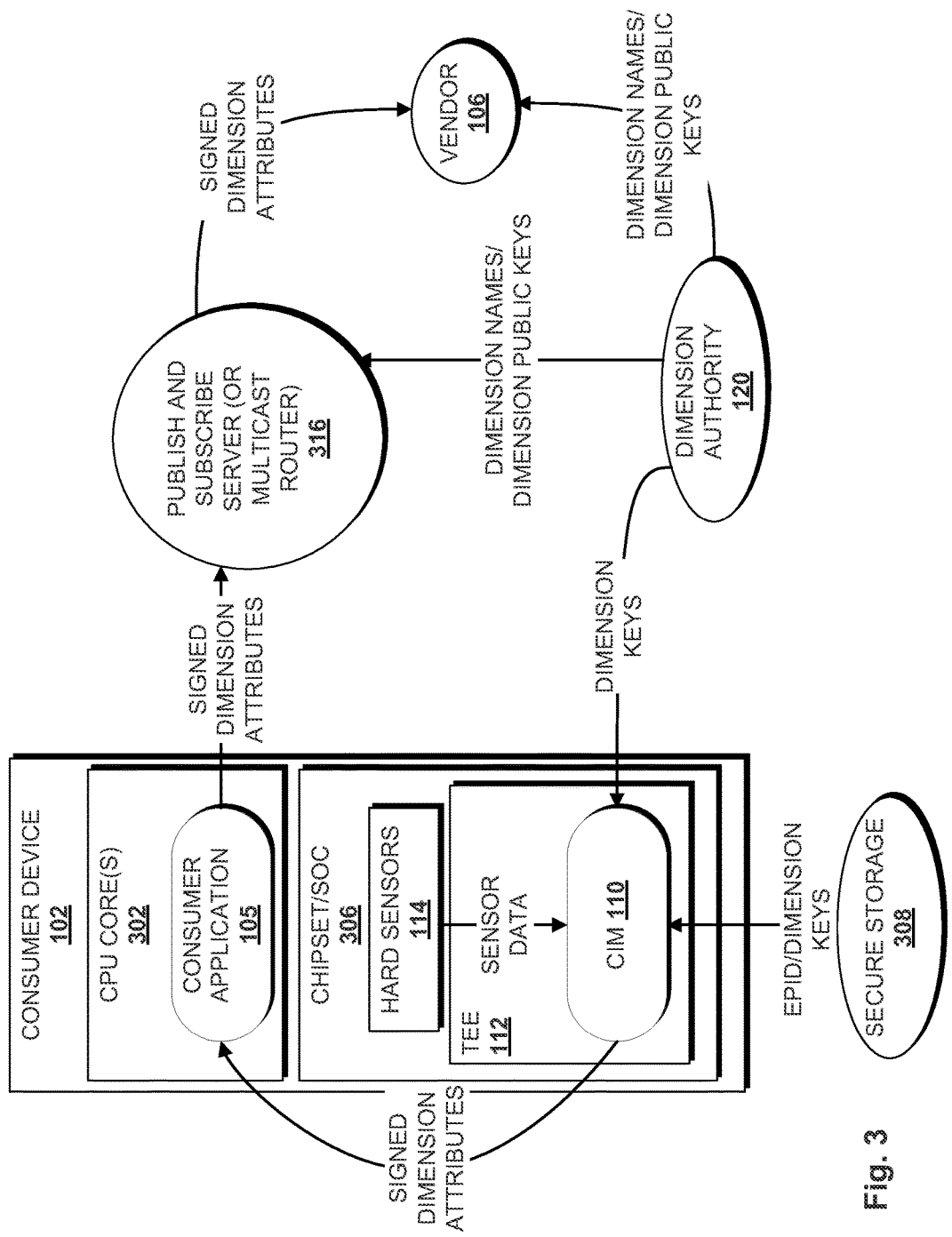
FIG. 3 schematically illustrates an example E-commerce exchange, in accordance with various embodiments.

FIG. 3 depicts consumer device 102 engaged in an exchange with a variety of different entities on the network, and illustrates various aspects of embodiments of the present disclosure. Consumer device 102, e.g., via CIM 110, may participate in a P&S exchange using one or more dimension attributes of the user or consumer device 102. Components of consumer device 102 pertinent to these aspects are depicted; other components from FIG. 1 may or more not be present in consumer device 102. Also, some additional components that may be found in consumer devices 102 are shown in FIG. 3 that are not shown in FIG. 1 (but may or may not nonetheless be present). For instance, consumer device 102 may include one or more processing units, depicted in FIG. 3 as one or more processing cores 302. One or more processing cores 302 may operate consumer application 105. One or more processing cores 302 may be coupled with a chipset 306 (or in some cases, a system on chip, or "SoC").

Chipset 306 may include various components that are not depicted in FIG. 3 but are often found on chipsets or SoCs, e.g., input/output ports, controllers, memory, etc. In various embodiments, chipset 306 may include hard sensors 114, such as the GPS and other sensors described throughout this disclosure. In this particular embodiment, chipset 306 may also include TEE 112. However, in other embodiments, such as embodiments in which TEE 112 is implemented using TXT, VT-x, TrustZone or other ucode based isolation mechanisms, TEE 112 may reside elsewhere, such as in plurality of cores 302.

In various embodiments, CIM 110 may be configured to authenticate consumer device 102 to various entities, e.g., dimension authority 120. Consumer device 102 may include secure storage 308 for storage of various data in a secure manner. In some embodiments, secure storage 308 may be remote from consumer device 102 and accessible. e.g., via a secure protocol. In other embodiments, secure storage 308 may be part of consumer device 102, e.g., accessible from within TEE 112.

In various embodiments, the EPID mentioned above may be stored in secure storage 308. The EPID may be used by CIM 110 to establish trustworthiness of, or "endorse," consumer device 102, e.g., to dimension authority 120, without enabling identification of a user of consumer device 102 and/or consumer device 102 itself. In various embodiments, the EPID, and in particular, an EPID private key, may be provisioned to consumer device 102, e.g., during manufacturing. In some embodiments, the EPID private key may be stored in secure storage 308. In various embodiments, EPID private keys may be indistinguishable from other private keys. Accordingly, signing communications with the EPID private key may not disclose personal information about a user or consumer device 102.

In various embodiments, an EPID public key may be distributed, e.g., by CIM 110 or an original equipment manufacturer ("OEM"), to verifying entities such as dimension authority 120. A single EPID public key may be configured to facilitate verification of multiple corresponding EPID private keys. The verifying entity may be able to determine that a particular private key is valid. However, in various embodiments, the verifying entity may not be able to identify which consumer device 102 provided the EPID private key. Accordingly, an identity of a user of consumer device 102 remains protected.

As noted above, in some embodiments or scenarios, consumer device 102 may broadcast or otherwise provide anonymous context information via the P&S paradigm. A P&S server 316 may be configured to provide "channels" between "subscribers," such as users of consumer devices 102, and "publishers," such as vendors 106 and other entities to which anonymous context information data may be provided. In some embodiments, users may subscribe in channels in which they have interest. Vendors 106 and other publishers (e.g., content aggregator 108, exchange node 104) may publish messages to channels, rather than directly to subscribers. In some embodiments, instead of or in addition to P&S server 316, a multicast router (not shown) may be employed.

In various embodiments, CIM 110 may be configured to provide signed dimension attributes to P&S server 316. Signed dimension attributes may include one or more dimension attributes of the user or consumer device 102, along with a digital signature or other similar data authenticating the user or computing device/environment to the dimension. In various embodiments, dimension attributes may be signed with a dimension key. As described above, a dimension key may be used by various entities, such as P&S server 316 or vendor 106, to verify that a dimension attribute is part of a legitimate dimension, e.g., tracked by a legitimate dimension authority, rather than an illegitimate dimension propagated to, e.g., create a false impression that a dimension attribute has a significant population. In various embodiments, each dimension tracked by dimension authority 120 may have its own dimension key that is only provided to consumer devices 102 that are able to authenticate themselves, and to other entities such as vendors 106 or exchange node 104 that may be authenticated in various ways. In embodiments where dimensions may be expressed as a taxonomy (e.g., car→red→four door→manual), each level of the taxonomy may have its own dimension key.

In various embodiments, the dimension attributes provided by consumer device 102 may be associated, e.g., by dimension authority 120, with one or more channels subscribed to by other consumer devices having the same dimension attributes. In some embodiments, CIM 110 may be configured to only permit subscription to channels associated with dimensions having population counts that comply with a risk tolerance (e.g., anonymity threshold) of the user of consumer device 102.

Figure 4:
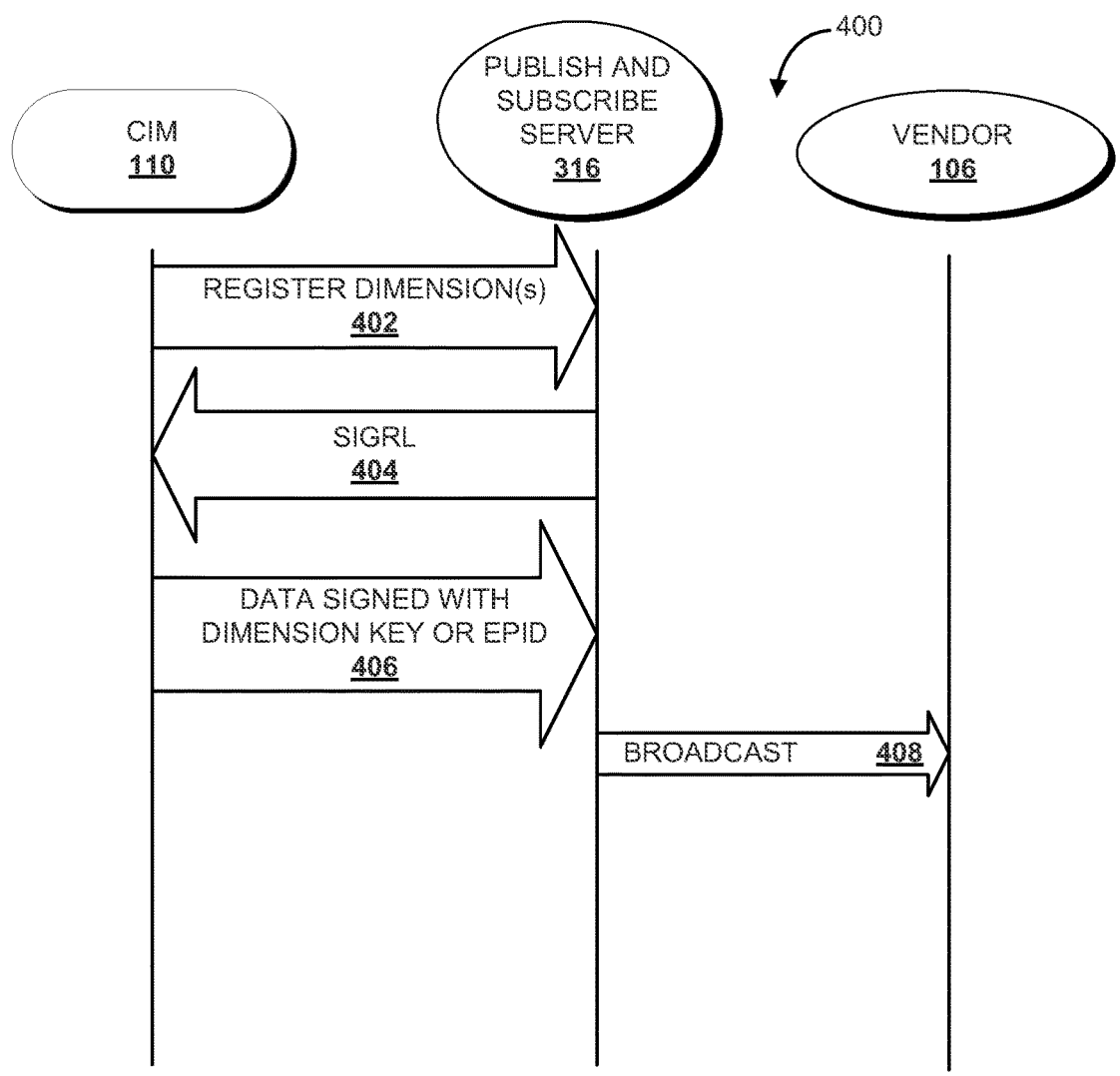
FIG. 4 schematically illustrates an example publish-and-subscribe exchange in which a consumer device uses a publish-and-subscribe server to publish anonymous context information, in accordance with various embodiments.

An example P&S exchange 400 is depicted in FIG. 4. In this example, CIM 110 may provide anonymous context information first to P&S server 316. P&S server 316 in turn may broadcast the anonymous context information to other entities. In other embodiments, CIM 110 may directly broadcast anonymous context information. However, a direct broadcast by CIM 110 may pose a higher risk that identification of the user will be enabled (e.g., via an IP address or other identifying information that may be incorporated into such a broadcast without the user's knowledge). Broadcasting anonymous context information through P&S server 316, on the other hand, may add a layer of concealment and reduce the likelihood that disclosure will enable user identification.

At arrow 402, CIM 110 may register, e.g., with P&S server 316, to publish anonymous context information including one or more dimension attributes. At arrow 404, P&S server 316 may provide, e.g., to CIM 110, a "signature revocation list," or "SigRL." A SigRL may be used by CIM 110 to prove to P&S server 316 that consumer device 102 is legitimate (e.g., has not been compromised by a man-in-the-middle attack) while maintaining anonymity of the user. At arrow 406, CIM 110 may provide, e.g., to P&S server 316, signed dimension data. In some embodiments, the dimension data may be signed with a dimension key. In some embodiments, the dimension data may be signed with an EPID private key. At arrow 408, P&S server 316 may broadcast the signed dimension attributes to publishers such as vendors 106.

As noted above, CIM 110 may authenticate consumer device 102 to dimension authority 120. Various types of authentication and/or verification protocols may be used to facilitate secure exchange of potential dimensions between consumer device 102 and dimension authority. In various embodiments, these protocols may be used to prevent, among other things, man-in-the-middle attacks.

Figure 5:
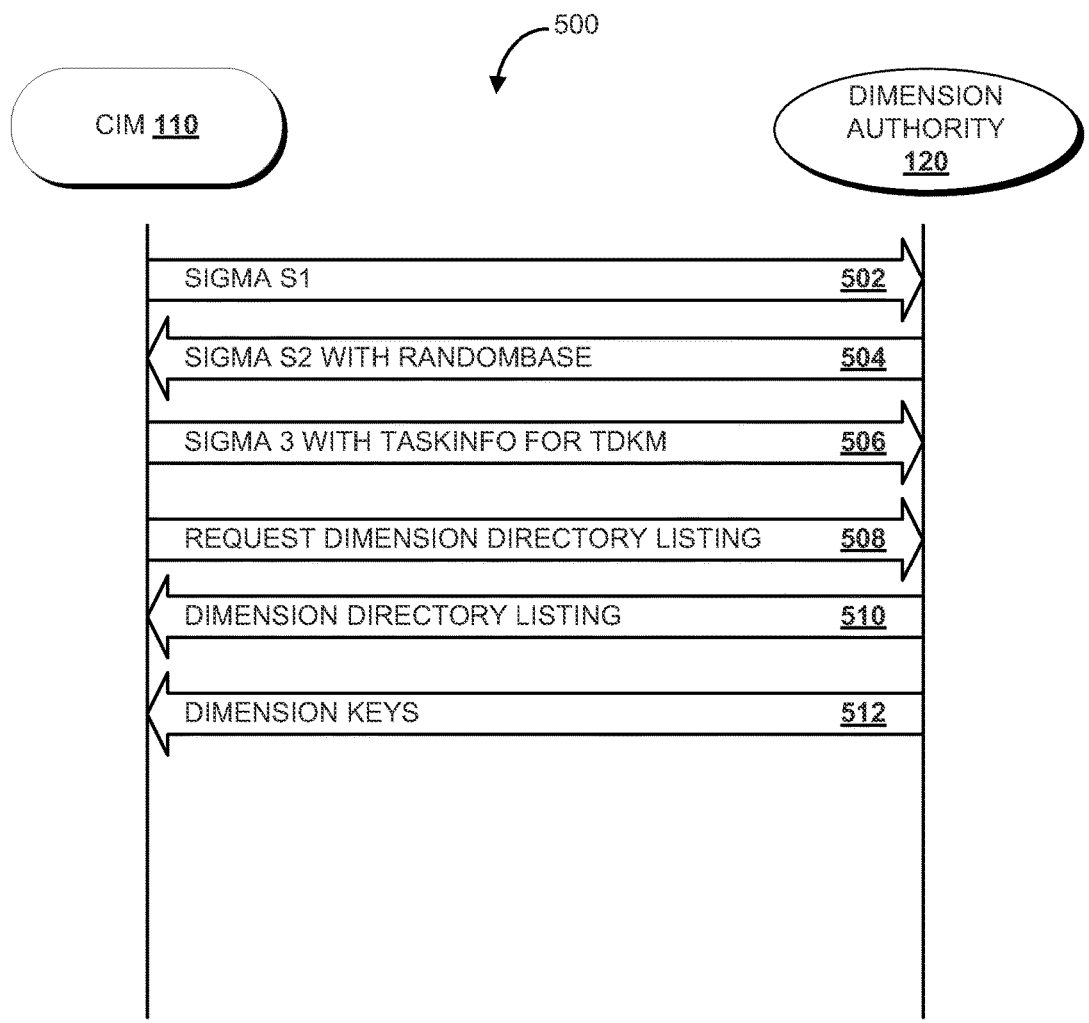
FIG. 5 schematically illustrates an example authentication and dimension provision session between a consumer device and a dimension authority, in accordance with various embodiments.

One example exchange 500 that may be implemented between CIM 110 and dimension authority 120 to facilitate secure provision of dimension keys is depicted in FIG. 5. This is an example of what is known as a "SIGn and MAc," or "SIGMA," exchange in which the client endpoint terminates in TEE 112. In various embodiments, exchange 500 may be implemented using a signed Diffie-Hellman protocol. In other embodiments, other exchange protocols may be used.

At arrow 502, CIM 110 may provide, e.g., to dimension authority 120, a SIGMA S1 message. In various embodiments, the SIGMA S1 message may be signed, e.g., by consumer device 102, using its EPID private key. For example, in various embodiments, CIM 110, acting as a "prover," may choose a random value, a, as its ephemeral Diffie-Hellman ("DH") key. CIM 110 may then compute $g^a$ as its ephemeral DH public key. CIM 110 may send a Group ID of its current EPID key and $g^a$ to the verifier, which in this example is dimension authority 120. In various embodiments, CIM 110 may also append an Online Certificate Status Protocol ("OCSP") Request.

At arrow 504, dimension authority 120 may provide, e.g., to CIM 110, a SIGMA S2 message that may be generated using a random-base identifier. For example, in various embodiments, dimension authority 120 may generate and transmit a SIGMA S2 message in accordance with the following:

1) dimension authority 120 may select a random value, b, as its ephemeral DH private key
2) dimension authority 120 may compute $g^b$ as its ephemeral DH public key.
3) dimension authority 120 may compute $g^{ab}=(g^a)^b$
4) dimension authority 120 may derive a secrecy MACing key ("SMK"), a secrecy key ("SK"), and a MACing key ("MK").

5) dimension authority 120 may then determine a SIG-RL corresponding to the Group ID of CIM 110.
6) dimension authority 120 may select a basename for the protocol, or it may set the basename to 0x00 for random based signatures.
7) dimension authority 120 may compute the MAC of SIG-RL, basename, OCSPRcq, OCSP response(s), and $Cert_{ver}$ using the SMK.
8) dimension authority 120 may sign ($g^a$||$g^b$) using its signing key to produce $Sig(g^a||g^b)$
9) dimension authority 120 may request n OCSP Responses from one or more OCSP responder servers, e.g., using a OCSP nonce exchanged in the S1 message. In some cases, n may be the number of certificates in dimension authority's certification chain. In some cases, the n OCSP responses may cover the n certificates in the Verifier certificate chain. In various embodiments, dimension authority 120 may wait for an OCSP response from CIM 110, and may verily the response upon receipt.
10) dimension authority 120 may send to CIM 110 the following: [$g^b$, BaseName, OCSPReq, $Cert_{ver}$, SIG-RL, OCSPResp]$_{SMK}$, and $Sig(g^a||g^b)$.

In various embodiments, CIM 110 may verify the received SIGMA S2 message. In some embodiments, CIM 110 may verify this data using steps similar to the following:
1) CIM 110 may compute $g^{ab}=(g^b)^a$
2) CIM 110 may derive SMK, SK and MK as described above
3) CIM 110 may verify the 1$^{st}$ certificate in the $Cert_{ver}$ chain using, e.g., an Intel Verification Key ("IVK") installed during manufacturing, e.g., by the Intel Corporation of Santa Clara, Calif.
4) CIM 110 may verify the MAC of BaseName, OCSPReq, $Cert_{ver}$, SIG-RL, and OCSP response (if any) using SMK.
5) CIM 110 may verify the n OCSP Responses (if needed).
   a) If CIM 110 is using the OCSP response for provisioning trusted time, the response may be non-cached and returned within, e.g., two minutes of sending the S1 message. If there are multiple OCSP responses, a ProducedAt time stamp of the first OCSP response received by CIM 110 may be used as trusted time.
   b) If CIM 110 is accepting non-cached responses, the timestamp in the response may be less than, e.g., one day old.
6) CIM 110 may verify the signature of ($g^a$||$g^b$) using the verifier's public key in $Cert_{ver}$.

After verifying the dimension authority certificate, at arrow 506, CIM 110 may generate and provide. e.g., to dimension authority 120, a SIGMA 3 message. In various embodiments, the SIGMA S3 message may include information describing a software and/or hardware configuration of TEE 112, including in some cases the ability of TEE 112 to support dimension provisioning. For example, in various embodiments, CIM 110 may generate and provide, e.g., to dimension authority 120, the SIGMA S3 message in accordance with the following:
1) CIM 110 may compute a MAC of the entire S3 message using SMK, e.g., to produce [TaskInfo||$g^a$||E-PIDCert$_{prvr}$||EPIDSig($g^a$||$g^b$)]$_{SMK}$.
2) CIM 110 may use its current EPID key and BaseName to sign ($g^a$||$g^b$), e.g., to produce EPID-Sig($g^a$||$g^b$). The EPID signature may include the non-revoked proofs based on SIG-RL.
3) CIM 110 may send [TaskInfo||$g^a$||EPIDCert$_{prvr}$||EPID-Sig($g^a$||$g^b$)]$_{SMK}$ to dimension authority 120.

In various embodiments, dimension authority 120 may use the SIGMA S3 message to determine whether CIM 110 is capable of protecting dimensions. For example, in various embodiments, dimension authority 120 may verify the SIGMA S3 message in accordance with the following:
1) dimension authority 120 may verify [TaskInfo||$g^a$||E-PIDCert$_{prvr}$||EPIDSig($g^a$||$g^b$)]$_{SMK}$ using SMK.
2) dimension authority 120 may verify $g^a$ is the same that arrived in the SIGMA S1 message.
3) dimension authority 120 may verify the EPID group certificate Cert$_{prvr}$ using IVK.
4) dimension authority 120 may verify the EPID signature of ($g^a$||$g^b$), including the revocation check.
5) dimension authority 120 may verify the TaskInfo structure which may not be required for all verifiers At arrow 508, CIM 110 may request, e.g., from dimension authority 120, a dimension directory listing. At block 510, dimension authority 120 may provide, e.g., to CIM 110, the requested dimension directory listing. At arrow 512, CIM 110 may provide, e.g., to dimension authority 120, one or more selected dimensions, e.g., to which consumer device 102 may subscribe. The subscribed dimensions may be associated with (e.g., signed by) the EPID, rather than with consumer device 102 or its user. In this way, dimension authority 120 may be able to tally a new member of a particular dimension (e.g., by adding one to the population count) without knowing an identity of the user.

At arrow 512, dimension authority 120 may provide, e.g., to CIM 110, dimension keys for the selected dimensions. In some embodiments, dimension authority 120 may generate a separate dimension key, e.g., based on an EPID public key, for each dimension. In some embodiments, dimension authority 120 may generate and provide, e.g., to CIM 110, a separate EPID private key for each subscribed dimension.

These techniques may enable multiple ways to prevent a rogue from propagating false dimensions. For example, if separate EPID private keys are used for each dimension, then even if a rogue obtains an EPID private key for one dimension, that rogue cannot authenticate itself to another dimension. Additionally or alternatively, an EPID key in combination with a dimension basename may be used to prevent similar issues.

Upon completion of the data exchange of FIG. 5, CIM 110 may terminate the SIGMA session. Meanwhile, dimension authority 120 may update a count associated with dimensions to which CIM 110 subscribed, e.g., by incrementing the count by one.

In various embodiments, the SIGMA protocol may be used in other scenarios, e.g., when CIM 110 provides signed dimension attributes to P&S server 316. In some such cases, a SIGMA basename may contain a taxonomic dimension attribute path representing the dimension attribute to be disclosed (e.g. "vehicle→pickup→extended cab"). Rather than signing with a dimension key specific to the most granular dimension attribute of the path (e.g., "extended cab"), CIM may sign with a parent dimension (e.g., vehicle) key.

Referring back to FIG. 3, CIM 110 may provide signed dimension attributes to consumer application 105. Consumer application 105 may in turn provide the signed dimension attributes to other entities, such as vendors 106 and/or P&S server 316. In some embodiments where consumer application 105 broadcasts signed dimension attributes using P&S server 316, as shown in FIG. 3, CIM 110 may digitally sign the dimension attributes using an EPID-named base. In embodiments where consumer application 105 broadcasts signed dimension data using a multicast network, CIM 110 may digitally sign dimension data using an EPID for the specified dimension. Signing dimensions in this manner may enable entities such as P&S server 316 to track dimension disclosure statistics, without enabling user identification.

P&S server 316 may broadcast signed dimension attributes to entities such as vendor 106. In various embodiments, vendor 106 may verify anonymous context information received from consumer devices 102. For instance, vendor 106 may verify one or more signed dimensions using an EPID public key or dimension keys obtained from dimension authority 120, e.g., via a trust anchor provisioning scheme. If vendor 106 determines that a signed dimension attribute received from consumer device 102 is not authentic, that may indicate a possible misuse of a dimension key. In such case, vendor 106 may notify dimension authority 120. However, if vendor 106 successfully verifies the authenticity of the signed dimension attributes, then vendor 106 may process the dimension for use in E-commerce, e.g., by generating or requesting content targeted towards the verified dimension.

Figure 6:
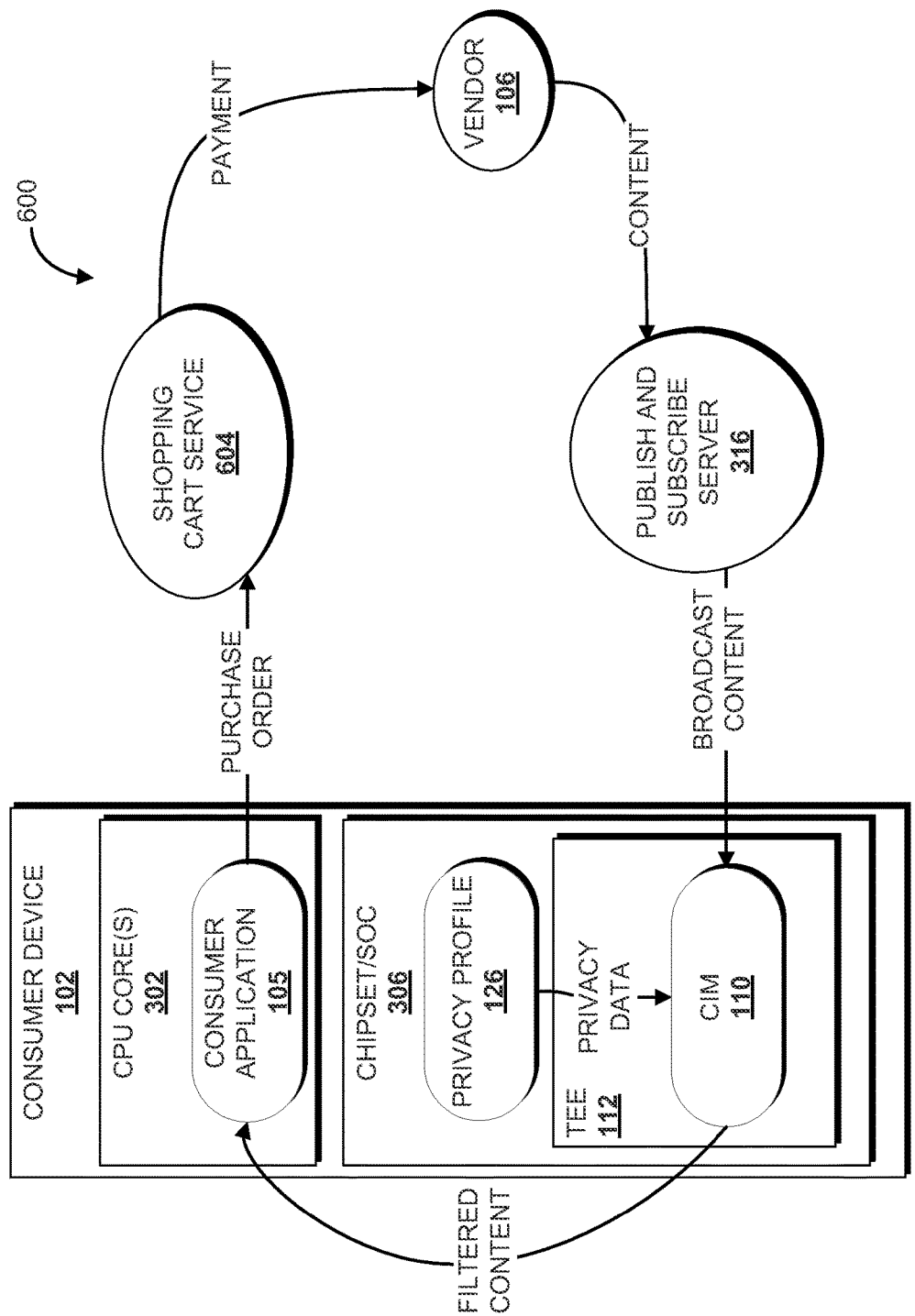
FIG. 6 schematically illustrates another example E-commerce exchange, in accordance with various embodiments.

FIG. 6 depicts an example scenario 600 in which P&S server 316 and other entities may facilitate generation and provision of targeted content to consumer device 102. Vendor 106 may generate content (e.g., advertisements, offers, coupons) that is targeted towards various dimension attributes or combinations of dimension attributes. In various embodiments, vendor 106 may publish the targeted content to a particular subscriber class, associated with one or more dimensions, that is maintained by P&S server 316. P&S server 316 may in turn broadcast the targeted content to consumer devices 102 subscribed to that particular class. This may avoid a requirement of user authentication as a prerequisite to receiving targeted content.

In various embodiments, vendor 106 may be configured to generate content that targets a temporary dimension attribute of consumer device 102 or its user. For instance, vendor 106 may target a first offer containing a small discount to a dimension channel of P&S server 316 subscribed to by consumer devices 102 that are at least a predetermined distance from a brick-and-mortar location of vendor 106 (e.g., as measured by a GPS). Vendor 106 may target a second offer containing a steeper discount to a dimension channel of P&S server 316 subscribed to by consumer devices 102 that are less than the predetermined distance from a brick-and-mortar location of vendor 106. The steeper discount may entice undecided consumers already near a brick-and-mortar location to enter and redeem the second offer. As another example, a food vendor 106 may target an offer with a discount to a P&S server dimension channel subscribed to by users whose online calendars reveal they have not eaten for more than a predetermined time interval.

In various embodiments, CIM 110 may be configured to filter broadcasted content received from P&S server 316, e.g., as depicted at block 226 of FIG. 2. Unwanted content (e.g., spam) may be filtered out. e.g., by CIM 110 based on privacy profile 126, user or consumer device attributes, and so forth, so that only content that satisfies the user's privacy profile 126 is presented to the user for consumption. For instance, assume consumer device discloses a dimension attribute, "last meal," that occurred of seven hours ago. The user's consumer device 102 may receive the offer from the aforementioned food vendor 106. However, CIM 110 may determine, e.g., based on user-configured settings, past purchase history, or current dimension attribute measures (e.g., the user has a dimension attribute <location, "Sal's Diner">), that the user is not interested in food offers. In such case, CIM 110 may discard the received offer as spam.

In various embodiments, CIM 110 may be configured to examine the privacy implications of engagement of a particular targeted content and make a suitable recommendation to the user, e.g., as depicted in blocks 228-234 of FIG. 2. For instance, assume a particular targeted content offers a product X for a 40% discount to users having the following three dimension attributes: A={affiliates of a particular group}; B={older than a particular age}: and C={located in a particular state}. CIM 110 may analyze the dimensions containing these attributes and associated counts to determine the likelihood that membership in an intersection of these dimension attributes (e.g., A∩B∩C) will enable identification of the user. If the likelihood is too high (e.g., higher than an anonymity threshold set forth in threshold database 118), then CIM 110 may prevent or discourage the user from engaging the targeted content (e.g., block 230 of FIG. 2), in spite of the fact that the user may have to pay more for the same product. Otherwise, CIM 110 may notify the user that engagement of the targeted content is "safe," e.g., as depicted at block 234 of FIG. 2.

Referring back to FIG. 6, the user may engage the targeted content by operating consumer application 105 to submit a purchase order to, e.g., a shopping cart service 604. Shopping cart service 604 may be configured to operate as a "middleman" for one or more vendors 106. In various embodiments, shopping cart service 604 may provide payment to vendor 106. In other embodiments, vendor 106 itself may operate an internal shopping cart service, forgoing a middleman such as shopping cart service 604. In such case, consumer application 105 may submit a purchase order and/or payment directly to vendor 106. In some such embodiments, consumer device 102 may alter or otherwise obfuscate its IP address, e.g., using randomization or network address translation, to prevent vendor 106 from being able to identify consumer device 102 using its IP address.

In various embodiments, vendor 106 may be configured to "learn" from engaged targeted content. For instance, the more users engage an advertisement targeted towards a particular dimension attribute or combination of dimension attributes, the more confident vendor 106 may be that the selected dimension attribute or combination of dimension attributes is a compelling target. Vendor 106 may further generate and refine targeted content based on subsequent user engagement, so that future users have a more compelling experience, and marketing efforts of vendor 106 are increasingly successful.

Figure 7:
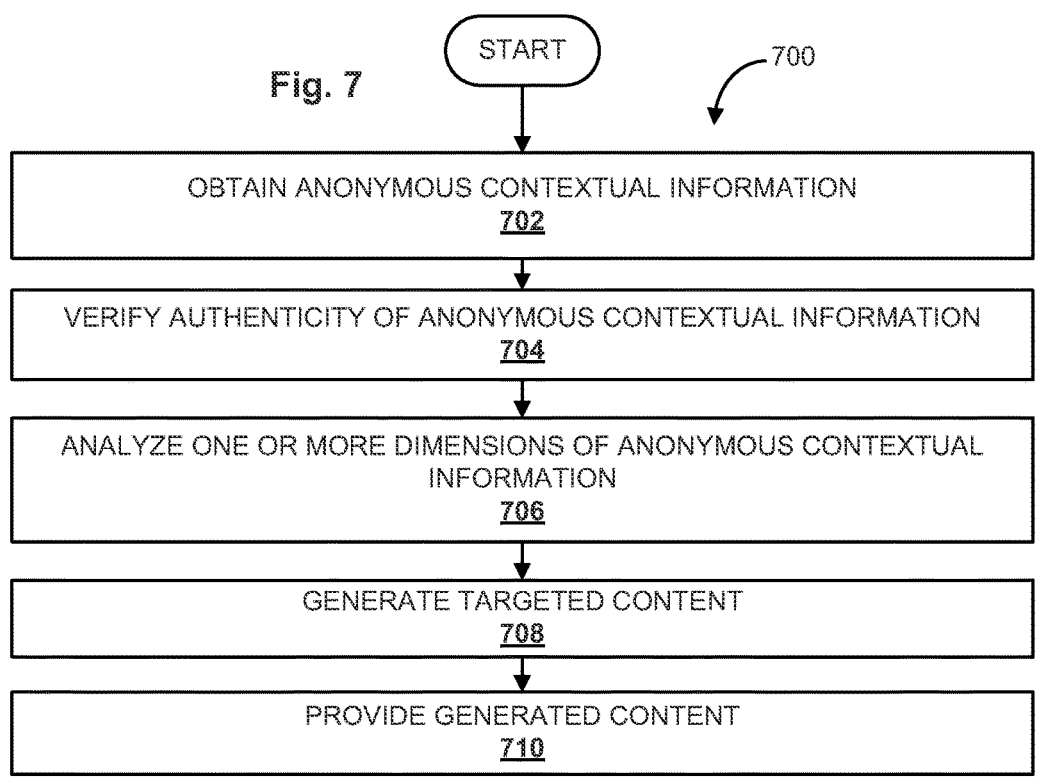
FIG. 7 schematically illustrates an example method that may be implemented by a content generating or providing entity, in accordance with various embodiments.

FIG. 7 depicts an example method 700 that may be implemented in various embodiments by a content generator/provider such as vendor 106, an advertiser (not shown), etc. At block 702, vendor 106 may obtain, e.g., from dimension authority 120 and/or CIM 110, anonymous context information.

At block 704, vendor 106 may verify an authenticity of the anonymous context information, e.g., by verifying a dimension authority domain associated with the data, a dimension name, and/or a dimension key. In some embodiments, EPID signatures may be verified, e.g., by vendor 106, using EPID public keys. In various embodiments, vendor 106 may be configured to securely obtain the public keys from dimension authority 120, e.g., by using various keys such as an X.509 certificate. In other embodiments, vendor 106 may implement a Verifier side of a SIGMA protocol. For example, vendor 106 may verify the dimension names/keys and "b" values from consumer device 102 using the dimension authority's 120 certificate. Vendor 106 may then complete the SIGMA session for the signed dimension data received from P&S server 316 (or multi-cast router). Because "b" may be shared among vendors 106, SIGMA session keys may be the same for each vendor 106. This may alleviate the need for consumer device 102 to manage pair-wise session keys for each vendor 106.

At block 706, vendor 106 may analyze one or more dimension attributes of the anonymous context information. In various embodiments, vendor 106 may hypothesize which combination of dimension attributes may be compelling, either to a user who provided the anonymous context information or other users. For example, vendor 106 may identify a demographic that includes some or all of the dimension attributes of the anonymous context information.

This hypothesis may be based on other information as well. For example, dimension authority 120 may not be aware of which specific users or computing environments have which particular attributes, and therefore may not be able to determine a population count of users or computing environments sharing two different attributes. Thus, in various embodiments, dimension authority 120 may be configured to estimate a population count of a union between users or computing environments sharing a first dimension attribute and users or computing environments sharing a second dimension attribute. In various embodiments, this estimation may be based on a collected data sample obtained, e.g., via a survey targeted to a focus group.

At block 708, vendor 106 may generate targeted content (e.g., advertisement, coupon, offer, etc.), e.g., based on the analysis. At block 710, vendor 106 may broadcast the generated content to consumer devices 102 of potentially interested users. For example, vendor 106 may provide the content to P&S server 316. P&S server 316 may then provide the targeted content to consumer devices 102 subscribed to a channel corresponding to the hypothesized dimension attribute.

Figure 8:
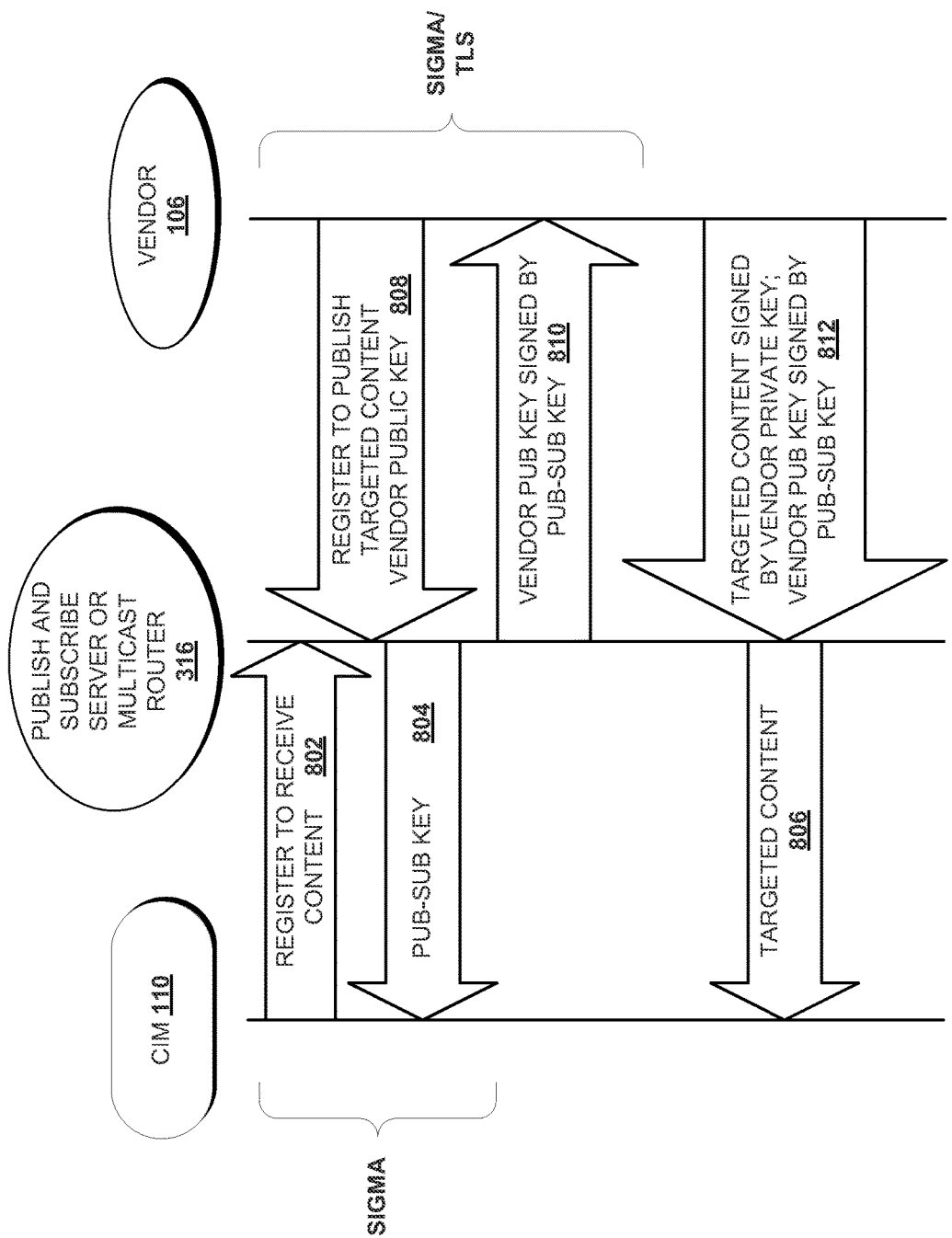
FIG. 8 schematically illustrates another example publish-and-subscribe exchange in which a consumer device subscribes to a channel, and a content provider registers to publish to the channel, in accordance with various embodiments.

FIG. 8 depicts an example of how CIM 110 and content-generating or content-providing entities such as vendor 106 may register with P&S server 316 to facilitate E-commerce exchanges like the one depicted in FIG. 6, and operation of method 700 of FIG. 7. At arrow 802, CIM 110 may register, e.g., with P&S server 316, to receive targeted content, e.g., by providing anonymous context information. In various embodiments, CIM 110 may first determine that a likelihood that disclosure of the anonymous context information will enable user identification does not violate risk tolerance of the user, as shown in FIG. 2 at blocks 210-222.

At arrow 804, P&S server 316 may provide, e.g., to CIM 110, a P&S key corresponding to a particular P&S channel. In various embodiments, the exchange represented by arrows 802 and 804 may be implemented using a SIGMA exchange similar to the one described above. In various embodiments, the P&S key may be used, e.g., by CIM 110 to verify vendors 106 are authorized to participate in a market. At arrow 806, the P&S server 316 may provide, e.g., to CIM 110, content targeted towards dimension attributes of the P&S channel.

A similar exchange may occur between a content generating or providing entity such as vendor 106 and P&S server 316. At arrow 808, vendor 106 may register, e.g., with P&S server 316, to publish targeted content, and/or provide a vendor public key. At arrow 810, P&S server 316 may provide, e.g., to vendor 106, the vender public key signed with the pub-sub key that was provided to CIM 110 at arrow 806. In various embodiments, the exchange represented by arrows 808 and 810 may be implemented using a SIGMA exchange similar to the one described above, or transport layer security ("TLS," formerly known as secure shell, or "SSH").

At arrow 812, vendor 106 may provide, e.g., to P&S server 316 for distribution to subscribers, content targeted to the P&S channel. In various embodiments, the targeted content may be signed by the vendor's private key, as well as the vendor's public key signed by the pub sub key. CIM 110 may utilize the pub sub key (which it received at arrow 806) to verify and/or decrypt the vendor public key. CIM 110 may then use the vendor public key to verify and/or decrypt the targeted content which is signed with the vendor private key. In some embodiments, vendor 106 may inject metadata into the targeted content, e.g., identifying one or more dimensions to which the content is targeted.

Figure 9:
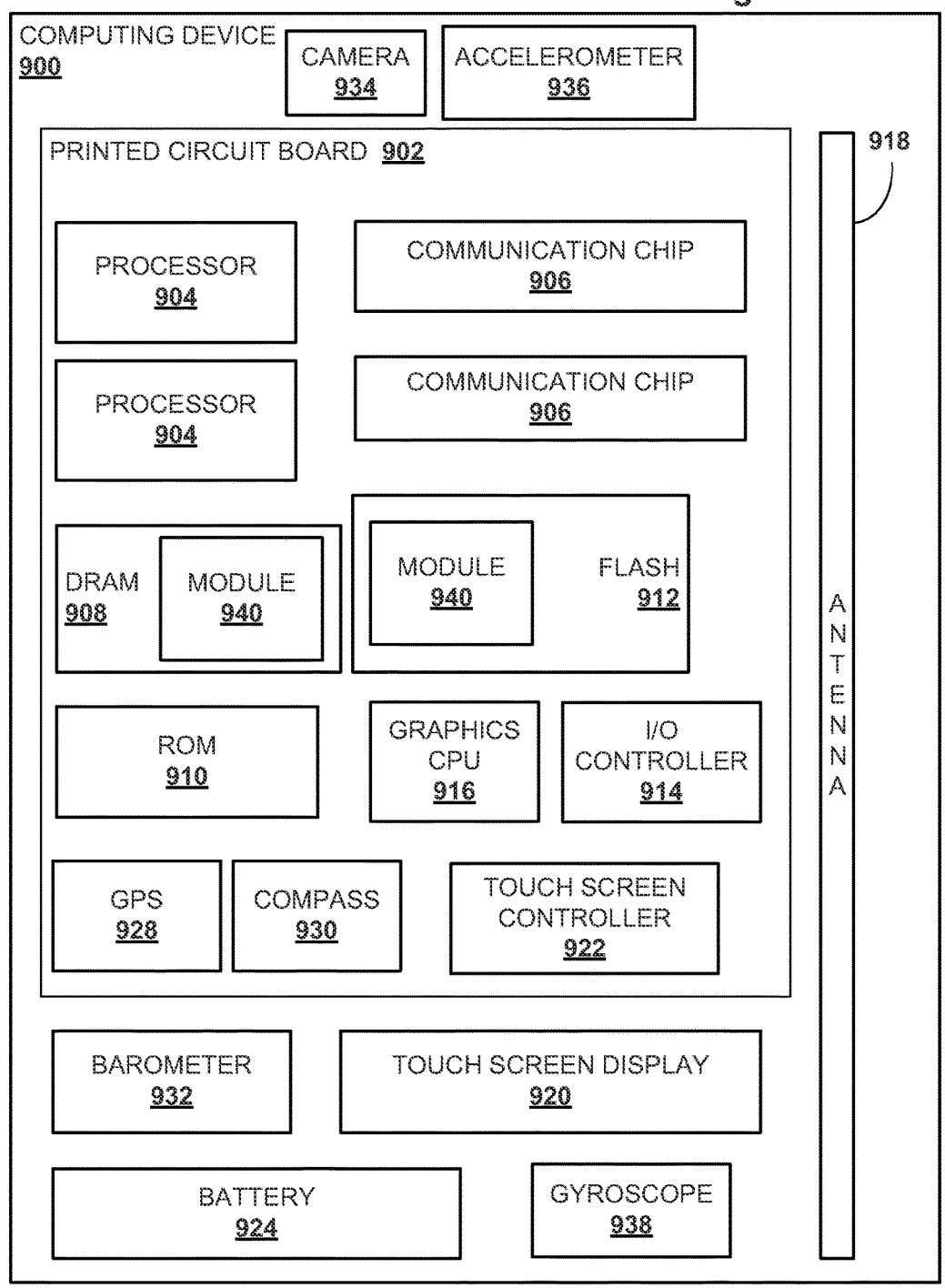
FIG. 9 schematically illustrates a computing device in accordance with one implementation of the invention.

FIG. 9 illustrates an example computing device 900, in accordance with various embodiments. Consumer device 102 or another network entity (e.g., 104, 106, 108, 120, 316) as described herein, as well as all or part of a computing environment, may be implemented on a computing device such as computing device 900. Computing device 900 may include a number of components, one or more processor(s) 904 and at least one communication chip 906. In various embodiments, the one or more processor(s) 904 each may be a processor core. In various embodiments, the at least one communication chip 906 may also be physically and electrically coupled to the one or more processors 904. In further implementations, the communication chip 906 may be part of the one or more processors 904. In various embodiments, computing device 900 may include printed circuit board ("PCB") 902. For these embodiments, the one or more processors 904 and communication chip 906 may be disposed thereon. In alternate embodiments, the various components may be coupled without the employment of PCB 902.

Depending on its applications, computing device 900 may include other components that may or may not be physically and electrically coupled to the PCB 902. These other components include, but are not limited to, volatile memory (e.g., dynamic random access memory 908, also referred to as "DRAM"), non-volatile memory (e.g., read only memory 910, also referred to as "ROM"), flash memory 912, an input/output controller 914, a digital signal processor (not shown), a crypto processor (not shown), a graphics processor 916, one or more antenna 918, a display (not shown), a touch screen display 920, a touch screen controller 922, a battery 924, an audio codec (not shown), a video codec (not shown), a global positioning system ("GPS") device 928, a thermometer (not shown), a Geiger counter (not shown), a compass 930, a barometer 932, a camera 934, and a mass storage device (such as hard disk drive, a solid state drive, compact disk ("CD"), digital versatile disk ("DVD"))(not shown), an accelerometer 936, a gyroscope 938, and so forth. In various embodiments, the processor 904 may be integrated on the same die with other components to form an SoC.

In various embodiments, volatile memory (e.g., DRAM 908), non-volatile memory (e.g., ROM 910), flash memory 912, and the mass storage device may include programming instructions configured to enable computing device 900, in response to execution by one or more processors 904, to practice all or selected aspects of methods and/or data exchanges 200, 400, 500, 700 or 800, depending on whether computing device 900 is used to implement consumer device 102, dimension authority 120, P&S server 316, vendor 106, or other entities described herein. More specifically, one or more of the memory components such as volatile memory (e.g., DRAM 908), non-volatile memory (e.g., ROM 910), flash memory 912, and the mass storage device may include temporal and/or persistent copies of instructions that, when executed, by one or more processors 904, enable computing device 900 to operate one or more modules 940 configured to practice all or selected aspects of methods and/or data exchanges 200, 400, 500, 700 or 800, depending on whether computing device 900 is used to implement consumer device 102, dimension authority 120, P&S server 316, vendor 106, or other entities described herein. In various embodiments, one or more processors 904, together with portions of volatile memory (e.g., DRAM 908), non-volatile memory (e.g., ROM 910), and/or flash memory 912 may be configured to provided a secure partition for the earlier described trusted execution environment 112.

The communication chips 906 may enable wired and/or wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to IEEE 902.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi and Bluetooth and a second communication chip 906 may be dedicated to longer range wireless communications such as GPS, EDGE, GPRS, CDMA, WiMAX, LTE, Ev-DO, and others.

In various implementations, the computing device 900 may be a laptop, a netbook, a notebook, an Ultrabook™, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 900 may be any other electronic device that processes data.

Embodiments of apparatus, packages, computer-implemented methods, systems, devices, and computer-readable media (transitory and non-transitory) are described herein for a CIM configured to determine a likelihood that disclosure of an attribute, of a user or of a computing environment associated with the user, will enable identification of the user, based on an associated population count of users or computing environments sharing the same attribute. In various embodiments, the attribute may be selectively disclosed, e.g., by the CIM, to a content provider configured to generate and/or provide targeted content. In various embodiments, a recommendation may be selectively provided. e.g., by the CIM, to the user as to whether the user should disclose the attribute to the content provider. In various embodiments, the selective disclosure and/or selective provision of the recommendation may be based on the determination and a risk tolerance associated with the user.

In various embodiments, the CIM may further be configured to obtain, from a dimension authority, one or more dimensions, each of the one or more dimensions including a user or computing environment attribute and associated population count of users or computing environments sharing that attribute. In various embodiments, the CIM may be configured to authenticate itself to the dimension authority using an EPID to facilitate secure provision of the plurality of dimensions by the dimension authority to the CIM without disclosing the user's identity to the dimension authority. In various embodiments, the obtain and authentication may be performed from within a trusted execution environment of a computing device. In various embodiments, the obtain and authentication may be performed as part of a SIGMA exchange.

In various embodiments, the plurality of dimensions may include a plurality of dimension keys configured to facilitate authentication the plurality of dimensions by the context information manager. In various embodiments, the user or computing environment attribute may include data captured by a sensor of the computing device. In various embodiments, the sensor may include an accelerometer, a GPS unit, a barometer, a camera, a compass, and/or a gyroscope. In various embodiments, the user or computing environment attribute may include an affinity of the user, demographic information about the user, or activity history of the user.

In various embodiments, the selective disclosure of the attribute may include disclosure of the user or computing environment attribute through a publish-and-subscribe server. In various embodiments, the selective disclosure of the attribute may include registration of the attribute with a publish-and-subscribe server. In various embodiments, the registration may include subscription to a publish-and-subscribe channel subscribed to by other users and/or computing environments sharing the user or computing environment attribute.

In various embodiments, the risk tolerance may include an anonymity threshold associated with the content provider or the user or computing environment attribute. In various embodiments, the selective disclosure of the attribute or the recommendation may include comparison of an anonymity index based on the associated population count to the anonymity threshold.

In various embodiments, the user or computing environment attribute and associated population count may together comprise one of n dimensions under consideration for disclosure, n being a positive integer. Each of the n dimensions may include an attribute of the user or of the computing environment associated with the user. In various embodiments, the anonymity index is calculated using the formula:

$$1 - \sum_{i=0}^{n} \frac{1}{\log_2 d_i}$$

wherein $d_i$ is a population count associated with dimension i, and i is a positive integer.

In various embodiments, the anonymity index may be cumulative of past disclosure of another attribute, of the user or the computing environment associated with the user, to the content provider. In various embodiments, the determination of the likelihood that disclosure of the attribute will enable identification of the user may be further based on a total population of unique users registered with the dimension authority.

In various embodiments, selective disclosure may include authentication of the attribute with a dimension key. In various embodiments, the dimension key may be stored in secure storage inaccessible outside of a trusted execution environment of the computing device.

In various embodiments, the CIM may be configured to determine a likelihood that engagement of a targeted content will enable identification of the user. In various embodiments, the CIM may be further configured to discourage engagement of the targeted content responsive to a determination that the likelihood that engagement of the targeted content will enable identification of the user does not comply with the risk tolerance, and/or to encourage engagement of the targeted content responsive to a determination that the likelihood that engagement of the received targeted content will enable identification of the user complies with the risk tolerance. In various embodiments, selective disclosure of an attribute may include anonymization of the attribute, e.g., via entropy injection, addition of another dimension attribute, and/or exclusion of a dimension attribute from disclosure.

In various embodiments, the CIM may be further configured to selectively provide a targeted content to the user for consumption based on a determination of whether the user is likely to be interested in the targeted content. In various embodiments, the determination of whether the user is likely to be interested in the targeted content may be based on a dimension that includes a transitory attribute of the user or of the associated computing environment, and an associated population count of users or computing environments sharing the transitory attribute. In various embodiments, the determination of whether the user is likely to be interested in the targeted content may be based on a dimension that includes an undisclosed attribute of the user or of the associated computing environment, and an associated population count of users or computing environments sharing the undisclosed attribute.

In various embodiments, the selective disclosure of the attribute or the selective provision of the recommendation may be based on an estimate of a population count of a union between users or computing environments sharing a first dimension attribute and users or computing environments sharing a second dimension attribute. In various embodiments, the estimation may be based a collected data sample.

In various embodiments, the selective provision of the attribute or recommendation may be further based on a security level of a computer system and/or a network through which a disclosed attribute would pass.

In another aspect, embodiments of apparatus, packages, computer-implemented methods, systems, devices, and computer-readable media (transitory and non-transitory) are described herein for a content provider and/or generator configured to obtain, from a dimension authority, one or more dimensions, each dimension including a user or computing environment attribute and a population count of users or computing environments that share that attribute. In various embodiments, the content provider and/or generator may generate content targeted towards a user or computing environment attribute of the one or more dimensions.

In various embodiments, the generation may be based on a hypothesis that the targeted content is likely to be engaged by one or more users. In various embodiments, the generation may be based on past user engagement of other content targeted towards the one or more attributes.

In various embodiments, the targeted content may be generated for publication on a publish-and-subscribe channel subscribed to by one or more computing environments sharing one or more computing environment or user attributes. In various embodiments, the targeted content may be generated for publication on a multicast channel. In various embodiments, the content provider and/or generator may associate metadata with the generated targeted. In various embodiments, the metadata may identify a dimension attribute to which the content is targeted.

In another aspect, embodiments of apparatus, packages, computer-implemented methods, systems, devices, and computer-readable media (transitory and non-transitory) are described herein for a computing device such as a P&S server and/or multicast router configured to provide a channel for subscription by one or more computing environments sharing one or more computing environment or user attributes, and to publish content targeted towards the one or more computing environment or user attributes on the channel. In various embodiments, each of the one or more attributes may be part of a dimension that also includes a population count of computing environments or users that share the attribute. In various embodiments, knowledge of the one or more attributes does not enable identification of a particular user of the one or more computing environments subscribed to the channel. In various embodiments, the channel may be a publish-and-subscribe channel. In various embodiments, the channel may be a multicast channel.

In another aspect, embodiments of apparatus, packages, computer-implemented methods, systems, devices, and computer-readable media (transitory and non-transitory) are described herein for a dimension authority configured to track a population count of users or computing environments that share an attribute. In various embodiments, the dimension authority may further be configured to provide a dimension including the attribute and the population count to a CIM that operates on behalf of a user, to enable the CIM to selectively disclose the attribute in exchange for content targeted towards the user. Additionally or alternatively, the dimension authority may be configured to provide the dimension to a content generator and/or provider to enable the content generator/provider to provide content targeted towards the attribute.

In various embodiments, the dimension authority may be configured to obtain an ontology specification that includes one or more user or computing environment attributes to be tracked. In various embodiments, the dimension authority may be configured to authenticate the contextual information manager using an EPID to facilitate secure provision of the dimension to the CIM. In various embodiments, the dimension authority may be configured to provide, e.g., to the CIM and/or to a content generator/provider, a dimension key corresponding to the dimension, the dimension key configured to facilitate authentication of the dimension.

In various embodiments, the dimension authority may be configured to estimate, based on a collected data sample, a population count of a union between users or computing environments sharing a first dimension attribute and users or computing environments sharing a second dimension attribute. In various embodiments, the dimension authority may be configured to provide, to the CIM or the content generator/provider, a total population of unique users tracked by the dimension authority.

In various embodiments, provision of the dimension by the dimension authority to the content generator/provider may include selective provision of the dimension based on an anonymity index computed using the population count of the dimension. In various embodiments, the selective provision may be further based on a comparison between the anonymity index and an anonymity threshold associated with the content generator/provider.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

What is claimed is:

1. At least one non-transitory computer-readable medium comprising instructions that, in response to execution of the instructions by a computer device, enable the computer device to operate a context information manager to manage interactions between computing environments on computer devices, with enhanced privacy protection for a user of one of the computing environments, the context information manager to:
   obtain with enforced thread and memory access isolation, from a dimension authority, one or more dimensions, each of the one or more dimensions including an attribute of the computing environment associated with the user and associated population count of computing environments sharing that attribute, wherein the one or more dimensions are signed by the dimension authority using a public key corresponding to a private key;
   with enforced thread and memory access isolation, authenticate itself to the dimension authority using an enhanced privacy identifier ("EPID") to facilitate secure provision of the one or more dimensions by the dimension authority to the context information manager without disclosing the user's identity to the dimension authority, wherein the EPID comprises the private key, wherein the private key is provisioned to the computer device during manufacture of the computer device;
   determine a likelihood that disclosure of the attribute of the computing environment associated with the user will enable identification of the user, based on an associated population count of computing environments sharing the same attribute; and
   selectively disclose the attribute to a content provider in another computing environment configured to provide targeted content based on the determination and a risk tolerance associated with the user;
   wherein enforced thread and memory access isolation comprises a sign-and-mac ("SIGMA") exchange, wherein at least one message in the SIGMA exchange by the computer device is signed with the private key.

2. The at least one non-transitory computer-readable medium of claim 1, wherein the one or more dimensions comprises one or more dimension keys configured to facilitate authentication of the one or more dimensions by the context information manager, wherein dimension keys are only provided to the context information manager when the context information manager is able to authenticate itself to the dimension authority using the EPID.

3. The at least one non-transitory computer-readable medium of claim 1, wherein the computing environment attribute comprises data captured by a sensor of the computer device.

4. The at least one non-transitory computer-readable medium of claim 3, wherein the sensor includes at least one of an accelerometer, a global positioning system ("GPS") unit, a barometer, a camera, a compass, or a gyroscope.

5. The at least one non-transitory computer-readable medium of claim 1, wherein the computing environment attribute comprises at least one of an affinity of the user, demographic information about the user, or activity history of the user.

6. The at least one non-transitory computer-readable medium of claim 1, wherein the selective disclosure of the attribute comprises disclosure of the computing environment attribute through a publish-and-subscribe server.

7. The at least one non-transitory computer-readable medium of claim 1, wherein the selective disclosure of the attribute comprises registration of the attribute with a publish-and-subscribe server.

8. The at least one non-transitory computer-readable medium of claim 7, wherein the registration comprises subscription to a publish-and-subscribe channel subscribed to by other computing environments sharing the computing environment attribute.

9. The at least one non-transitory computer-readable medium of claim 1, wherein the risk tolerance comprises an anonymity threshold associated with the content provider or the computing environment attribute, and the selective disclosure of the attribute comprises comparison of an anonymity index based on the associated population count to the anonymity threshold.

10. The at least one non-transitory computer-readable medium of claim 9, wherein the computing environment attribute and associated population count together comprise one of n dimensions under consideration for disclosure, n being a positive integer, each of the n dimensions including an attribute, of the computing environment associated with the user, and wherein the anonymity index is calculated using the formula:

$$1 - \sum_{i=0}^{n} \frac{1}{\log_2 d_i}$$

wherein $d_i$ is a population count associated with dimension i, and i is a positive integer.

11. The at least one non-transitory computer-readable medium of claim 9, wherein the anonymity index is cumulative of past disclosure of another attribute, of the computing environment associated with the user, to the content provider.

12. The at least one non-transitory computer-readable medium of claim 1, wherein the determination of the likelihood that disclosure of the attribute will enable identification of the user is further based on a total population of unique users registered with the dimension authority.

13. The at least one non-transitory computer-readable medium of claim 1, wherein the selective disclosure comprises authentication of the attribute with a dimension key.

14. A device comprising computer processor circuitry to operate a context information manager to manage interactions between computing environments on computer devices, the context information manager configured to:

obtain with enforced thread and memory access isolation, from a dimension authority, one or more dimensions, each of the one or more dimensions including an attribute of a computing environment associated with a user and associated population count of computing environments sharing that attribute, wherein the one or more dimensions are signed by the dimension authority using a public key corresponding to a private key;

with enforced thread and memory access isolation, authenticate itself to the dimension authority using an enhanced privacy identifier ("EPID") to facilitate secure provision of the one or more dimensions by the dimension authority to the context information manager without disclosing the user's identity to the dimension authority, wherein the EPID comprises the private key, wherein the private key is provisioned to the computer processor circuitry during manufacture of computer processor circuitry;

determine a likelihood that disclosure of an attribute, of the computing environment associated with the user, will enable identification of the user, based on an associated population count of computing environments sharing the same attribute; and selectively disclose the attribute to a content provider in another computing environment configured to provide targeted content based on the determination and a risk tolerance associated with the user;

wherein enforced thread and memory access isolation are performed as part of a sign-and-mac ("SIGMA") exchange, wherein at least one message in the SIGMA exchange by the device is signed with the private key.

15. The device of claim 14, wherein the one or more dimensions comprises a one or more dimension keys configured to facilitate authentication of the one or more dimensions by the context information manager, wherein dimension keys are only provided to the context information manager when the context information manager is able to authenticate itself to the dimension authority using the EPID.

16. The device of claim 14, wherein the computing environment attribute comprises data captured by a sensor of the device.

17. The device of claim 14, wherein the computing environment attribute comprises at least one of an affinity of the user, demographic information about the user, or activity history of the user.

18. The device of claim 14, wherein the selective disclosure of the attribute comprises disclosure of the computing environment attribute through a publish-and-subscribe server.

19. The device of claim 14, wherein the selective disclosure of the attribute comprises registration of the attribute with a publish-and-subscribe server.

20. The device of claim 14, wherein the risk tolerance comprises an anonymity threshold associated with the content provider or the computing environment attribute, and the selective disclosure of the attribute or a recommendation comprises comparison of an anonymity index based on the associated population count to the anonymity threshold.

* * * * *

UNITED STATES PATENT AND TRADEMARK OFFICE
CERTIFICATE OF CORRECTION

PATENT NO. : 9,626,693 B2  
APPLICATION NO. : 13/997918  
DATED : April 18, 2017  
INVENTOR(S) : Ned Smit et al.

Page 1 of 1

It is certified that error appears in the above-identified patent and that said Letters Patent is hereby corrected as shown below:

In the Claims

Column 28  
Line 4, "...a one ore more..."" should read – ...one or more... –

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*